US012763916B2

(12) United States Patent
Hafeez et al.

(10) Patent No.: US 12,763,916 B2
(45) Date of Patent: Oct. 13, 2026

(54) AUTOMATED FREQUENCY COORDINATION (AFC) SYSTEM AND METHOD FOR CONTROLLING FREQUENCY SHARING AND/OR INTERFERENCE IN A COMMUNICATIONS SYSTEM

(71) Applicant: Charter Communications Operating, LLC, St. Louis, MO (US)

(72) Inventors: Rauf Hafeez, Cary, NC (US); Saul A. Torrico, Bethesda, MD (US)

(73) Assignee: Charter Communications Operating, LLC, St. Louis, MO (US)

(*) Notice: Subject to any disclaimer, the term of this patent is extended or adjusted under 35 U.S.C. 154(b) by 712 days.

(21) Appl. No.: 18/198,252

(22) Filed: May 16, 2023

(65) Prior Publication Data

US 2024/0388410 A1 Nov. 21, 2024

(51) Int. Cl.

*H04W 72/0453* (2023.01)
*H04L 5/00* (2006.01)
*H04W 72/541* (2023.01)

(52) U.S. Cl.

CPC ....... *H04L 5/0073* (2013.01); *H04W 72/0453* (2013.01); *H04W 72/541* (2023.01)

(58) Field of Classification Search

None

See application file for complete search history.

(56) References Cited

U.S. PATENT DOCUMENTS 5,367,533 A * 11/1994 Schilling ................ H04B 7/216
375/140

OTHER PUBLICATIONS

Attila Hilt et al., Fixed MW access network design using interference matrices, Sep. 10-11, 2003 (Year: 2003).*
Telecommunications Industry Association, TIA/EIA Telecommunication Systems Bulletin, Interference Criteria for Microwave Systems, TSB-10F (Revision of TSB-10E), Jun. 1994, 199 pages.

* cited by examiner

*Primary Examiner* — The Hy Nguyen

(74) *Attorney, Agent, or Firm* — Straub & Straub; Michael P. Straub; Stephen T. Straub

(57) ABSTRACT

Methods and/or apparatus for implementing an automated or automatic frequency coordination (AFC) system are described. The method involves determining if allowing a transmitter to use spectrum, e.g., a frequency or band of frequencies, will result in unacceptable interference to another device or if the interference produced by the transmitter will be within an acceptable level. The method involves generating and storing Threshold to Interference (T/I) ratio tables, e.g., based on actual transmitter and/or receiver characteristic information, prior to a request to use spectrum being received. The T/I tables are stored in a T/I threshold database which is accessed and used to determine if a transmitter will create unacceptable interference to a device within the transmit area of the transmitter if frequency sharing is permitted. The T/I threshold tables can be computed, stored and the values stored therein can be used for multiple frequency use decisions by one or more AFC systems.

20 Claims, 13 Drawing Sheets

300

500

| | 502 | 504 |
|---|---|---|
| | EXEMPLARY T/I TABLE (FOR A TRANSMITTER DEVICE / RECEIVER DEVICE PAIR) | |
| | Δf | T/I (dB) |
| 506 | 0 | 35 |
| 508 | 2 | 35 |
| 510 | 4 | 34 |
| 512 | 5 | 34 |
| 514 | 6 | 26 |
| 516 | 8 | 12 |
| 518 | 10 | 0 |
| 520 | 12 | -12 |
| 522 | 14 | -26 |
| 524 | 16 | -36 |
| 526 | 18 | -46 |
| 528 | 20 | -53 |

FIGURE 5

AUTOMATED FREQUENCY COORDINATION (AFC) SYSTEM AND METHOD FOR CONTROLLING FREQUENCY SHARING AND/OR INTERFERENCE IN A COMMUNICATIONS SYSTEM

FIELD

The present application relates to frequency sharing and more particularly to methods and/or apparatus for implementing an automated frequency coordination system that uses stored information tables, e.g., tables including pre-computed values used in estimating interference, generated from actual transmitter and/or receiver characteristic information.

BACKGROUND

6 GHz band spectrum is shared between unlicensed users and incumbent fixed service (FS) receivers. To limit interference an Automated Frequency Coordination (AFC) system may be used. Use of an AFC system has been proposed in Wireless Innovation Forum (sometimes referred to as WINNFORUM).

An AFC often includes a frequency controller (FC) that controls access to various frequencies in the band based on an interference estimate. One important component of how to share the spectrum is the knowledge of the level of interference a digital receiver can tolerate. The determination of the allowable interference into a digital system is based on the consideration of the ratio of the desired to the undesired signal power that degrades the digital receiver's noise sensitivity by a certain dB level (e.g., 1 dB). At present the allowable interference is determined by using the approximated mask of the Power Density Function (PDF) of the interfering signal and the approximated frequency response mask of the digital receiver filter. This approach tends to over-protect the digital receiver, resulting in a conservative frequency sharing between the two systems and thus a waste of frequency resources. The same frequency control mechanism is used in some cases for frequency sharing between two unlicensed or lightly licensed systems in shared spectrum such as CBRS Band, resulting in conservative frequency sharing.

The commonly used current approach to interference management, which is based on approximations of both transmitter and receiver characteristics, is a conservative approach which tends to over-protect the higher priority device(s) leading to wasted resources. Based on the above discussion, there is a need for new methods and apparatus for determining more precise levels of expected interference and/or determining more precise levels of allowable interference, in a shared spectrum environment, than is possible using approximations of both receiver and transmitter characteristics or functions.

Unfortunately, convolutions used in making interference estimates or frequency sharing decisions, such as those based on the approach highlighted in Telecommunications Industry Association (TIA) bulletin TSB-10F (the full cite to which is: TIA/EIA Telecommunication Systems Bulletin—Interference Criteria for Microwave Systems TSB-10F dated June 1994 which is hereby expressly incorporated by reference in its entirety), are computationally complex to implement. Accordingly, even if a device requesting the right to use spectrum provided information about is transmitter power density function at the time of making a spectrum sharing request, there might not be a reasonable amount of time available to perform detailed interference computations involving potential devices subject to interference in the time in which a frequency sharing decision is expected.

In view of the above, it should be appreciated that there is a need for methods and/or apparatus which will allow for improved spectrum sharing decisions which can take into consideration actual transmitter and/or receiver characteristics but not require convolutions relating to transmitter and receiver functions or masks to be performed at the time of decision making which can be computationally intensive and/or time consuming to implement.

SUMMARY

Methods and/or apparatus for implementing an automated frequency coordination system are described. The method involves determining if allowing a transmitter to use spectrum, e.g., a frequency or band of frequencies, will result in unacceptable interference to another device or if the interference produced by the transmitter will be within an acceptable level in which case the spectrum can be shared.

The method involves generating and storing Threshold to Interference (T/I) ratio tables, based on actual transmitter and/or receiver characteristic information, prior to a request to use spectrum being received and processed. In at least some embodiments the T/I tables are generated for transmitter device and receiver device pairs using actual transmitter and/or receiver characteristic information rather than simply estimates or approximations relating to a transmitter or receiver device. The T/I tables are stored in a T/I threshold database which is accessed and used to determine if a transmitter will create unacceptable interference to a device within the transmit area of the transmitter if frequency sharing is permitted.

The T/I table corresponding to an individual transmitter device and receiver device pair stores a threshold value corresponding to a frequency separation between the carrier frequency of the interfering signal and the receiver center frequency based, in some but not necessarily all implementations, on the approach discussed in in TIA Telecommunication Systems Bulletin—Interference Criteria for Microwave Systems TSB-10F, June 1994.

The T/I threshold tables used by the frequency controller in some embodiments and is obtained by calculating the tables threshold values a priori based on the approach highlighted in the TIA-10F bulletin (TIA Telecommunication Systems Bulletin—Interference Criteria for Microwave Systems TSB-10F, June 1994)

In various embodiments, a T/I threshold table database is used to store a plurality of T/I threshold tables for different transmitter device and receiver device pairs, each T/I threshold table including a plurality of T/I threshold values for an individual transmitter and receiver device pair, where each T/I threshold value in a T/I threshold table corresponds to a different amount of frequency separation. In one particular exemplary embodiment, a frequency coordination system, e.g., automatic frequency coordination (AFC) system, receives a frequency use request seeking permission for a first transmitter device to use a first frequency. The first frequency may be the center frequency of spectrum or a band which the first transmitter device seeks to use. The request may be sent by the first transmitter device or by another device seeking to determine if the first transmitter device is permitted to use the first frequency and/or spectrum corresponding to the first frequency. The AFC system identifies, e.g., based on location information and/or other stored or received information, a first potential victim device, e.g., a first receiver device, which may be subject to interference from the first transmitter device using the first frequency. The AFC system then retrieves from a first T/I threshold table stored in said T/I threshold table database, a first T/I threshold value based on a frequency separation between the first frequency used by the first transmitter and a frequency used by the first potential victim device. The first T/I threshold table is a T/I threshold table corresponding to the first transmitter device and the first potential victim device (e.g., a first victim receiver) which includes precomputed stored threshold values, e.g., one per possible frequency separation.

The AFC system makes a decision to: i) authorize use of the first frequency by the first transmitter based on the expected transmit power or Effective Isotropic Radiated Power (EIRP) of the first transmitter and the first T/I threshold value or ii) deny use of the first frequency by the first transmitter based on the expected transmit power or Effective Isotropic Radiated Power (EIRP) of the first transmitter and the first T/I threshold value.

In cases where AFC system determines that the transmitter use of the requested frequency will cause unacceptable interference the request to use the spectrum is denied. However, when an AFC system determines that use of the frequency/spectrum by the transmitter to which the frequency use request corresponds will not result in unacceptable interference the request is granted.

While the computation of the values in the T/I threshold tables can be computationally complex and involve one or more convolution operations, because the tables are computed for possible transmitter device and receiver device pairs prior to a request to use frequency being received, the decision process implemented by the AFC system can be relatively quick since it can be based, at least in part, in the pre-computed values stored in the T/I threshold tables.

Furthermore, it is possible to precompute the T/I threshold tables and load them into multiple AFC systems corresponding to different geographic regions. The computational resources used in generating the T/I threshold tables can be used in multiple different AFC systems without the need for individual AFC systems to perform the computations in real time in response to a frequency use request or other request to use spectrum. From a cost perspective this allows the hardware costs associated with generating the T/I threshold tables to be shared between AFC systems providing service to multiple different geographic regions.

There are four cases that are considered to create the T/I table versus frequency separation between the carrier frequency of the interfering signal and the receiver center frequency. The T/I ratio table can be generated by using any one of the following quantities: i) the actual Power Density Function (PDF) of the interfering signal and the actual frequency response of the digital receiver filter; ii) the approximated mask of the PDF of the interfering signal and the actual frequency response mask of the digital receiver filter; iii) the actual PDF of the interfering signal and the approximated frequency response mask of the digital receiver filter; and iv) the approximated mask of the PDF of the interfering signal and the approximated frequency response mask of the digital receiver filter.

In devices where information about the actual power density function of the interfering signal generated by a transmitter device and/or the actual mask of the digital receiver filter used in a receiver device are used in generating the T/I threshold table for a transmitter device and receiver device pair, the more reliable the prediction of the effect of interference will be and thus more efficient spectrum allocation can be achieved than when approximations are used for both the transmitter and receiver device.

The methods of the invention have the advantages of generating, in some cases, a permanent or long-term database of actual T/I threshold values for different possible transmitter device and receiver device pairs, based on the actual PDF of the interfering signals and/or the actual frequency response of the digital receiver filter in the receiver device.

Since the T/I tables can be generated and prestored they need not be computed on the fly and the computations performed in generating the T/I tables need not be repeated regardless of the number of AFC systems which use the database. Thus, a significant effort can be made in generating the database because it is an information resource that can be reused repeatedly as interference decisions are made by one or more AFC systems at different times.

The methods of the present invention have the potential to provide more realistic T/I threshold values for a particular frequency separation between the carrier frequency of the interfering signal and the receiver center frequency than current methods because they can be based on accurate information and precomputed without concerns for the T/I values to be generated in real time when making a decision. Higher differences between the mask and the actual frequency response used in the present invention as compared to in previous systems can result in better sharing of spectrum between devices since the decisions can be made based, at least in some cases, on more accurate T/I threshold values than were available in previous systems which based such determinations completely on approximations rather than actual information corresponding to a transmitter device and receiver device pair.

By using the threshold T/I tables and stored values included in the tables, frequency use authorization decisions can be make more quickly than in systems where T/I threshold values are generated in real time in response to a frequency use request and potentially with more accurate information being used since actual transmitter and/or receiver device characteristic information is used in at least some embodiments for computing the values stored in the T/I table database used in some embodiments.

Numerous variations on the above described methods and apparatus are described in the detailed description which follows.

BRIEF DESCRIPTION OF THE FIGURES

FIG. 5 is an exemplary T/I table for an exemplary transmitter device and receiver device pair.

DETAILED DESCRIPTION

Figure 1:
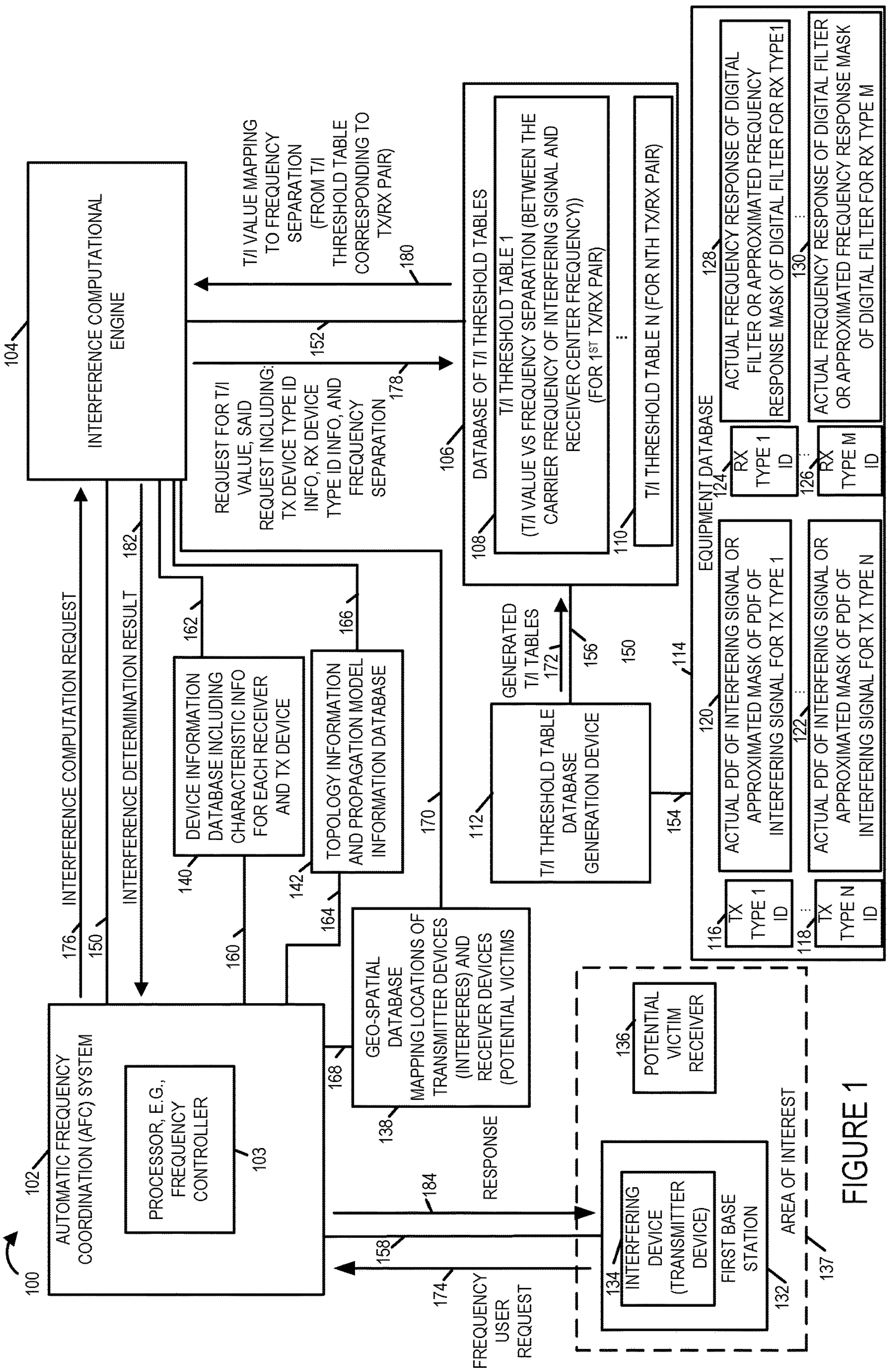
FIG. 1 is drawing of an exemplary system for estimating interference and facilitating efficient spectrum allocation in an environment in which spectrum may be shared in accordance with an exemplary embodiment.

FIG. 1 is drawing of an exemplary system 100 for estimating interference and facilitating efficient spectrum allocation in an environment in which spectrum may be shared in accordance with an exemplary embodiment. Exemplary communications system 100 includes an automatic frequency coordination (AFC) system 102, an interference computational engine 104, and a database 106 of T/I threshold tables.

AFC system is coupled to interference computational system 104 via communications link 150. Interference computational engine 104 is coupled to database 106 via communications link 152.

Database 106 includes a plurality of T/I threshold tables (T/I threshold table 1 108, . . . , T/I threshold table N 110. Each of the plurality of T/I threshold tables corresponds to different combinational pair of a transmitter device (interfering device) and a receiver device (potential victim receiver device). T/I threshold table 1 108 is T/I value vs frequency separation table, for a 1st TX device/RX device pair, where the frequency separation is between the carrier frequency of the interfering signal and the receiver center frequency. T/I threshold table 1 110 is T/I value vs frequency separation table, for a Nth TX device/RX device pair, where the frequency separation is between the carrier frequency of the interfering signal and the receiver filter frequency.

Exemplary system 100 further includes a T/I threshold table database generation device 112 and an equipment database 114, coupled together via communications link 154. The equipment database 114 includes information identifying a plurality of different types of transmitter devices (transmitter (TX) type 1 device ID information 116, . . . , transmitter (TX) type N device ID information 118), and corresponding information (actual PDF of interfering signal or approximated mask of PDF of interfering signal for TX type 1 device 120, . . . , actual PDF of interfering signal or approximated mask of PDF of interfering signal for TX type N device 122), respectively. The equipment database 114 further includes information identifying a plurality of different types of receiver devices (receiver (RX) type 1 device ID information 124, receiver (RX) type M device ID information 126), and corresponding information (actual frequency response of digital filter or approximated frequency response mask of digital filter for RX type 1 device 128, . . . , actual frequency response of digital filter or approximated frequency response mask of digital filter for RX type M device 130), respectively. The T/I threshold table database generation device, uses the equipment database information to identify pairs of a TX device and a receiver device, and to generate a T/I threshold table for each transmitter device/receiver device pair. The generated T/I threshold tables are sent for the T/I threshold table database generation device, via signals 172 over communications link 156 to database 106, where the T/I tables as stored, to be available to be used (accessed) in the future, e.g., by the interference computational engine. The generation of the tables is time intensive since convolution is involved.

System 100 further includes a geo-spatial database 138 mapping location of transmitter devices (interferers) and receiver devices (potential receiver victims) coupled to AFC system via communications link 168 and coupled to interference computational engine 104 via communications link 170. System 100 further includes device information database 140 including characteristic information for each transmitter and receiver device coupled to AFC system via communications link 164 and coupled to interference computational engine 104 via communications link 166. System 100 further includes a topology information and propagation model information database 142 coupled to AFC system via communications link 164 and coupled to interference computational engine 104 via communications link 166.

Exemplary communications system 100 further includes a first base station 132 including an interfering device (transmitter device) 134 and a potential victim receiver device 136. The interfering device 134 and the potential victim receiver device 136 are located within an area of interest 137, e.g., within the vicinity of one another at a distance that is considered by the AFC system 102 to have the potential for transmitter device 134 to potentially generate an unacceptable level of interference at the location of potential victim receiver 136.

First base station 132 is coupled to AFC system 102 via communications link 158. First base station 132 generates and sends a frequency user request 174, e.g., for bandwidth with a particular carrier frequency, to AFC system 102. In response to the request 174, the AFC decides to request to run an interference analysis between the interfering device 134 and the potential victim receiver 136, which are in proximity of each other. The processor 103, e.g., frequency controller of the AFC system 102 generates and sends interference computational request 176, via communications link 150 to interference computational engine 104. The interference computational request 176 includes information identifying the equipment type, e.g., by type ID information, of the transmitter device 134, information identifying the characteristics, e.g., interfering signals transmit power or EIRP, and interfering signal carrier frequency, of the transmitter device 134, information identifying the equipment type, e.g., by type ID information, of the potential victim receiver device 136, and characteristics, e.g. a center frequency of the digital receiver filter, of the digital receiver of potential victim receiver device 136.

The interference computational engine 104 receives the interference computational request 176 and recovers the communicated information. The interference computational engine performs an interference analysis for the transmitter device 134/receiver device 136 pair, based on the interfering signal transmit power or EIRP as well as other information such as the transmission path losses, e.g., using information obtained from databases 140, 142, and 138. The interference analysis includes computing a threshold level Tc of the victim receiver 136, computing interference level Ic at the receiver victim 136 from interferer transmitter device 134, and computing the ration Tc/Ic.

Interference computational engine 104 determines frequency separation (different in frequency (Δf)) between the carrier frequency of the interfering signal and the center frequency of the digital filter receiver. The interference computational engine 104 retrieves a T/I threshold value, corresponding to the TX device 134/RX device 136 pair, based on device type information, and the determined frequency separation. For example, the interference computational engine generates and sends a request 178 for a T/I value over communications link 152 to T/I threshold tables database 106, said request 178 including TX device type ID information, TX device type ID information and the determined frequency separation value. The database 106 receives the request 106, processes the received information, identifies the T/I threshold table corresponding to the identified device pair (based on the received device type information), and extracts the T/I threshold value from the identified table corresponding to the received frequency separation value. The database 106 generates and sends response signal 180 via communications link 152 to interference computational engine 104, said response signal 180 including the extracted T/I threshold value mapping to the frequency separation from the T/I threshold table corresponding to the TX/RX pair. Interference computational engine 104 receives response signal 180 and recovers the communicated T/I threshold value. The interference computation engine determines an interference margin, where interference margin=T/I−Tc/Ic. The interference computation engine 104 compares the determined interference margin to 0. If the margin is greater than 0, then the interference computation engine 104 determines that the first potential victim receiver 136 will be subjected to unacceptable interference. However, if the margin is not greater than 0, then the interference computation engine 104 determines that the first potential victim receiver 136 will not be subjected to unacceptable interference.

The interference computational engine 104 generates and sends, via communications link 150, interference determination result message 182 to AFC system 102, in response to interference computational request 176, said interference result message 182 includes the determination as to whether or not the transmitter device 134 operation will result in an unacceptable level of interference to potential victim receiver 136.

The AFC system 102 receives the interference determination result message 182 and recovers the communicated interference determination result. The AFC system 102 makes a decision whether or not to authorize use of the requested frequency by the transmitter 134 of first base station 132 based on the received interference determination result. The AFC system 102 authorizes the use of the requested frequency by the transmitter device 134 when the potential victim receiver device 136 will not be subjected to unacceptable interference. Alternatively, the AFC system 102 denies the use of the requested frequency by the transmitter device 134 when the potential victim receiver device 136 will be subjected to unacceptable interference. The AFC system 102 sends, via communications link 158, response message 184 to first base station 132, in response to request 174, said response communicating the AFC's decision with regard to transmitter 134 being allowed to use the requested frequency. The AFC's decision may, and sometimes does, includes a grant to use the requested frequency.

Figure 2A:
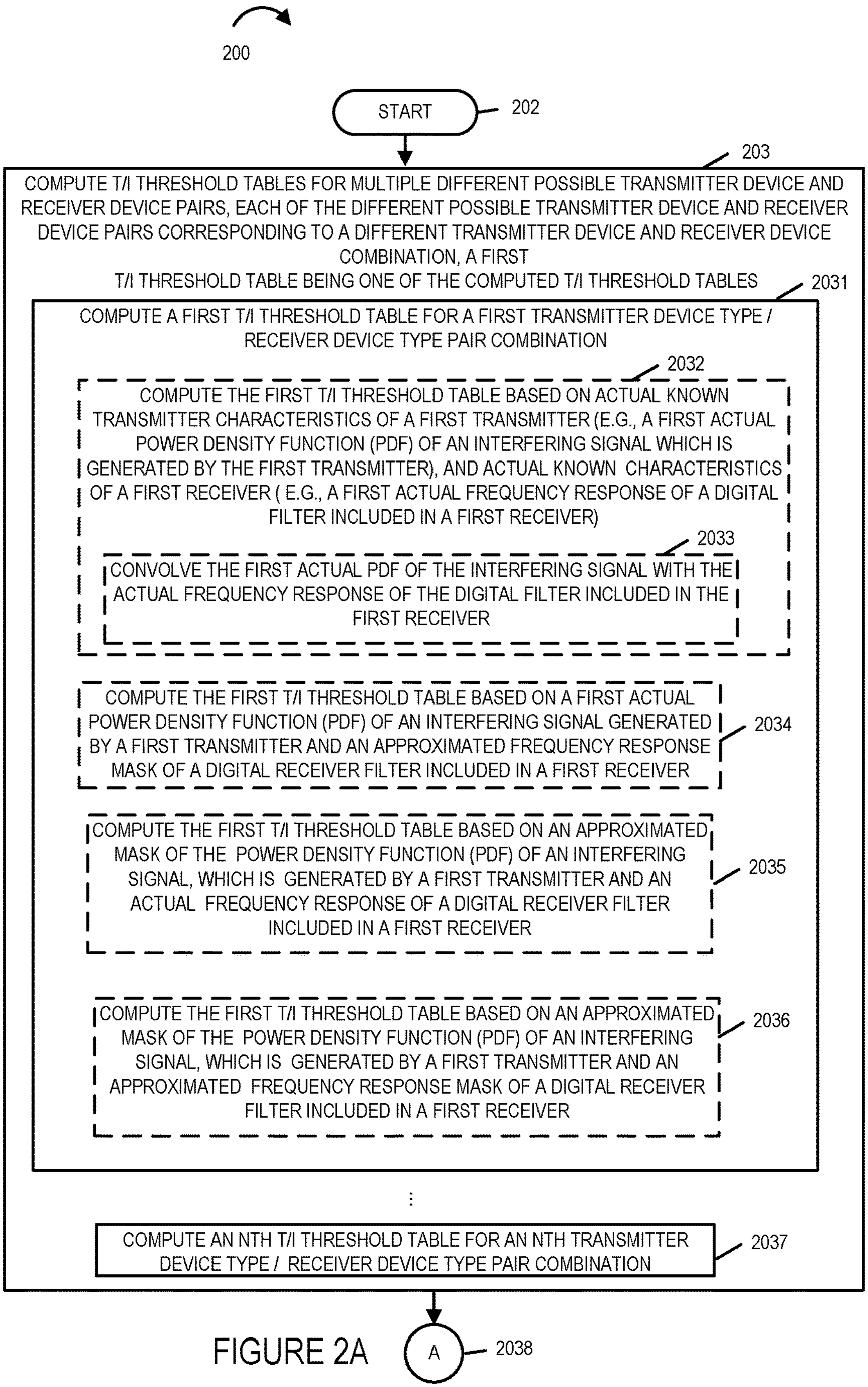
FIG. 2A is a first part of a flowchart of an exemplary method of controlling frequency sharing in accordance with an exemplary embodiment.
Figure 2B:
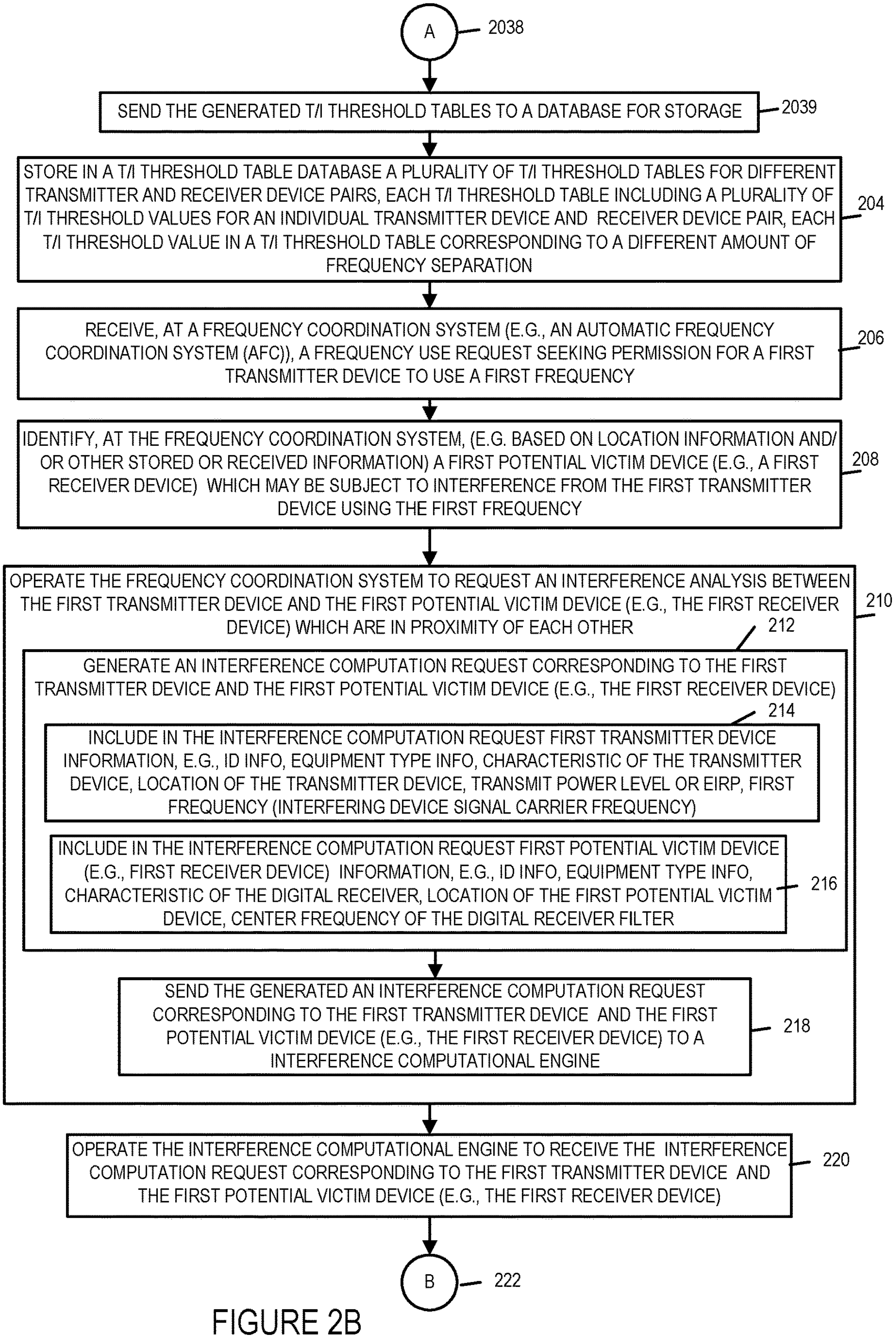
FIG. 2B is a second part of a flowchart of an exemplary method of controlling frequency sharing in accordance with an exemplary embodiment.
Figure 2C:
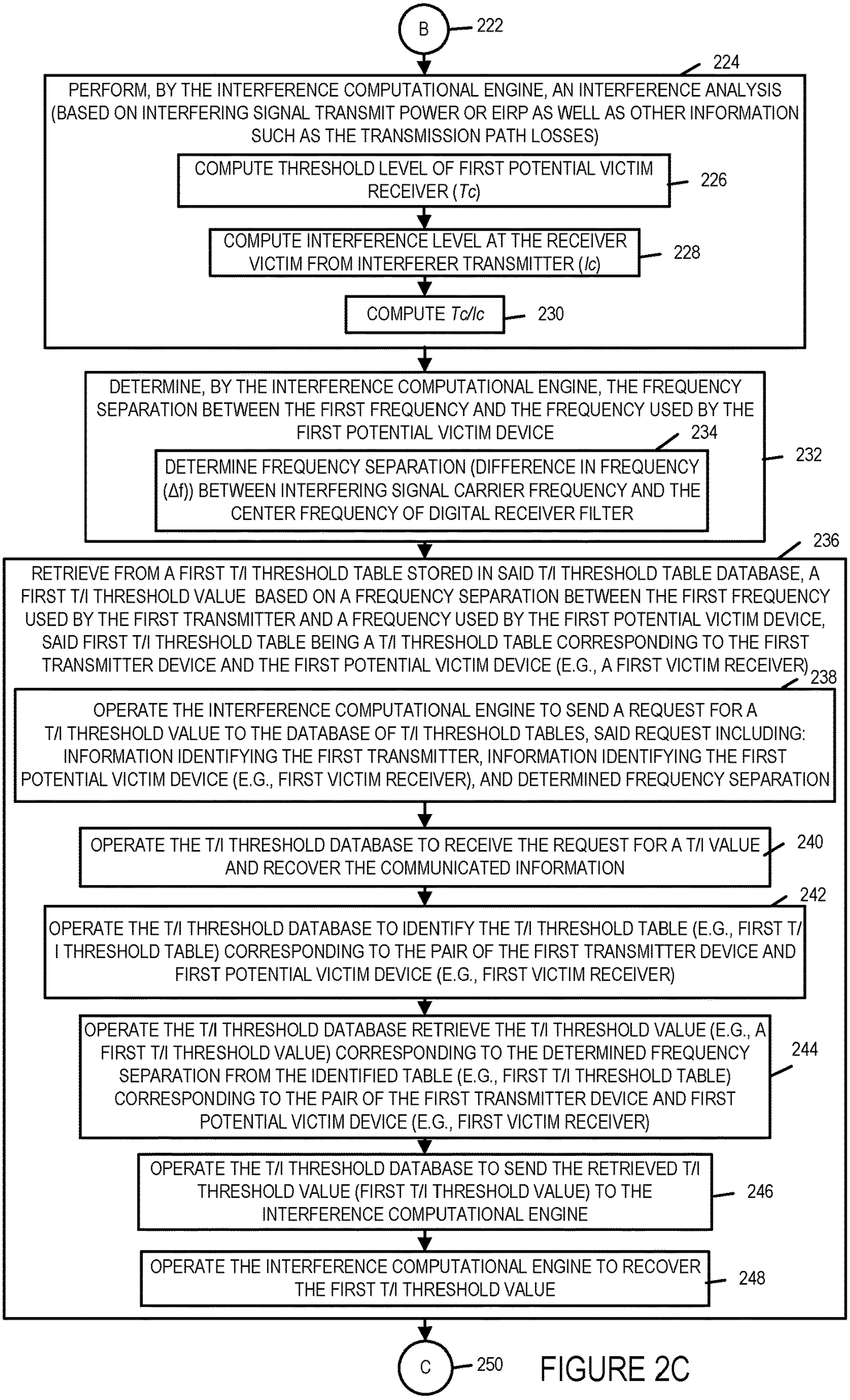
FIG. 2C is a third part of a flowchart of an exemplary method of controlling frequency sharing in accordance with an exemplary embodiment.
Figure 2D:
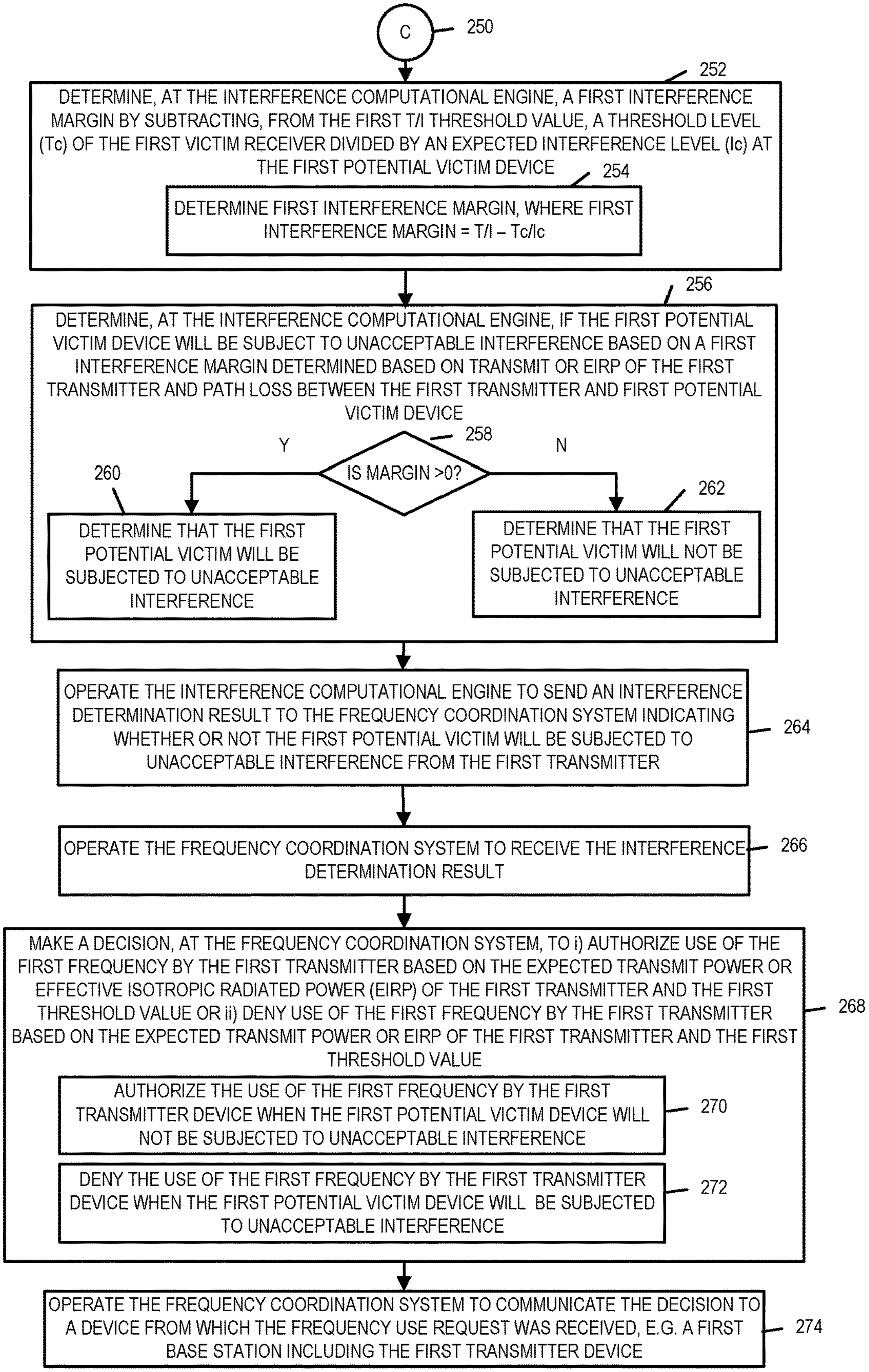
FIG. 2D is a fourth part of a flowchart of an exemplary method of controlling frequency sharing in accordance with an exemplary embodiment.
Figure 2:
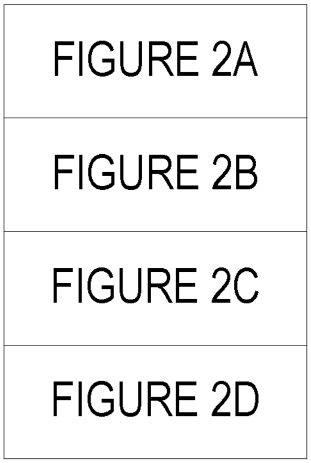
FIG. 2 comprises the combination of FIG. 2A, FIG. 2B, FIG. 2C and FIG. 2D.

FIG. 2, comprising the combination of FIG. 2A, FIG. 2B, FIG. 2C and FIG. 2D, is a flowchart of an exemplary method of controlling frequency sharing in accordance with an exemplary embodiment. The exemplary methos of flowchart 200 is performed, e.g., by system 100 of FIG. 1. Operation starts in step 202 and proceeds to step 203.

In step 203 T/I threshold table generation device 112 computes T/I threshold tables for multiple different possible transmitter device and receiver device pairs, each of the different possible transmitter device and receiver device pairs corresponding to a different transmitter device and receiver device combination, a first T/I threshold table being one of the computed T/I threshold tables. Step 203 includes step 2031 in the T/I threshold table generation device 112 computes a first T/I threshold table for a first transmitter device type/receiver device type pair combination and step 2037 in which the T/I threshold table generation device 112 computes an Nth T/I threshold table for an Nth transmitter device type/receiver device type pair combination.

Step 2031 includes one of alternative steps 2032, 2034, 2035, or 2036, e.g., depending on the availability of actual or mask information, e.g., with an actual profile taking precedence over a mask. In alternative step 2032 the T/I threshold table generation device 112 computes the first T/I threshold table based on actual known transmitter characteristics of a first transmitter (e.g., a first actual power density function (PDF) of an interfering signal which is generated by a first transmitter) and actual know characteristics of a first receiver (e.g., a first actual frequency response of a digital filter included in the first receiver). Step 2032 includes step 2033 in which the T/I threshold table generation device 112 convolves the first actual PDF of the interfering signal with the actual frequency response of the digital filter included in the first receiver.

In alternative step 2034 the T/I threshold table generation device 112 computes the first T/I threshold table based on a first actual power density function (PDF) of an interfering signal which is generated by a first transmitter and an approximated frequency response mask of a digital filter included in a first receiver device. In step 2034 the T/I threshold table generation device 112 convolves the first actual PDF of the interfering signal with the approximated frequency response mask of the digital filter included in the first receiver.

In alternative step 2035 the T/I threshold table generation device 112 computes the first T/I threshold table based on an approximated mask of the power density function (PDF) of an interfering signal which is generated by a first transmitter and an actual frequency response of a digital filter included in a first receiver device. In step 2034 the T/I threshold table generation device 112 convolves the approximated mask of the PDF of the interfering signal with the actual frequency response of the digital filter included in the first receiver.

In alternative step 2036 the T/I threshold table generation device 112 computes the first T/I threshold table based on an approximated mask of the power density function (PDF) of an interfering signal which is generated by a first transmitter and an approximated frequency response mask of a digital filter included in a first receiver device. In step 2036 the T/I threshold table generation device 112 convolves the approximated mask of the PDF of the interfering signal with the approximated frequency response mask of the digital filter included in the first receiver. Operation proceeds from step 203, via connecting node 2038, to step 2039.

In step 2039, the T/I threshold table generation device 112 sends the generated T/I threshold tables to database 106 of TI threshold tables for storage. Operation proceeds from step 2039 to step 204.

In step 204, the database 106 receives the T/I threshold tables and stores a plurality of T/I threshold tables for different transmitter and receiver device pairs, each T/I threshold table including a plurality of T/I threshold values for an individual transmitter device and receiver device pair, each T/I threshold value in a T/I threshold table corresponding to a different amount of frequency separation. Operation proceeds from step 204 to step 206.

In step 206 a frequency coordination system (e.g., an automatic frequency coordination system (e.g., AFC system 102) receives a frequency use request seeking permission for a first transmitter device, e.g., transmitter device 134, to use a first frequency. Operation proceeds from step 206 to step 208.

In step 208 the frequency coordination system identifies (e.g., based on location information and/or other stored or received information such as, e.g., transmitter power or EIRP, and propagation information), a first potential victim device (e.g., a first receiver device, e.g., potential victim receiver device 136), which may be subject to interference from the first transmitter device using the first frequency. Operation proceeds from step 208 to step 210.

In step 210 the frequency coordination system requests an interference analysis between the first transmitter device and the first potential victim device (e.g., the first receiver device) which are in proximity of each other. Step 210 includes step 212 and step 218. In step 212 the frequency coordination system generates an interference computation request corresponding to the first transmitter device and the first potential victim device (e.g., the first receiver device). Step 212 includes step 214 and step 216. In step 214 the frequency coordination system includes in the interference request first transmitter device information, e.g., ID information, equipment type information, characteristics of the transmitter device, location of the transmitter device, transmit power level or EIRP, first frequency (interfering device signal carrier frequency). In step 216 the frequency coordination system includes in the interference request first potential victim device (e.g., first receiver device) information, e.g., ID information, equipment type information, characteristics of the digital receiver, location of the first potential victim device, center frequency of the digital receiver filter. Operation proceeds from step 212 to step 218.

In step 218 the frequency coordination system sends the generated interference computation request corresponding to the first transmitter device and the first potential victim device (e.g., the first receiver device) to an interference computational engine, e.g., interference computational engine 104. Operation proceeds from step 210 to step 220.

In step 220 the interference computation engine receives the interference computation request corresponding to the first transmitter device and the first potential victim device (e.g., the first receiver device). Operation proceeds from step 220 via connecting node B 222 to step 224.

In step 224 the interference computational engine performs an interference analysis (based on interfering signal transmit power or EIRP as well as other information such as transmission path losses. Step 224 includes steps 226, 228 and 230. In step 226 the interference computational engine computes the threshold level Tc of the first potential victim receiver. Operation proceeds from step 226 to step 228, in which the interference computational engine computes the interference level Ic at the receiver victim from the interferer transmitter, e.g., based on transmit power or EIRP, locations of the victim receiver and interfering transmitter, and topology/propagation model information. Operation proceeds from step 228 to step 230, in which the computational engine computes the ratio Tc/Ic. Operation proceeds from step 224 to step 232.

In step 232 the interference computational engine determines the frequency separation between the first frequency and frequency used by the first potential victim device. Step 232 includes step 234, in which the interference computational engine determines the frequency separation (difference in frequency ($\Delta f$)) between the interfering signal carrier frequency and the center frequency of the digital receiver filter. Operation proceeds from step 232 to step 236.

In step 236 the interference computational engine retrieves from a first T/I threshold table stored in said T/I threshold database, a first T/I threshold value based on a frequency separation between the first frequency used by the first transmitter and a frequency used by the first potential victim device, said first T/I threshold table being a T/I threshold table corresponding to the first transmitter device and the first potential victim device (e.g., first victim receiver). Step 236 includes steps 238, 240, 242, 244, 246 and 248.

In step 238 the interference computational engine sends a request for a T/I threshold value to the database of T/I threshold tables, said request including information identifying the first transmitter (e.g., by TX device type), information identifying the first potential victim device (e.g., first victim receiver) (e.g., by RX device type), and the determined frequency separation. In step 240 the T/I threshold database receives the request for a T/I value and recovers the communicated information. In step 242 the T/I threshold database identifies the T/I threshold table (e.g., first T/I threshold table) corresponding to the pair of the first transmitter device and first potential victim device (e.g., first victim receiver). Operation proceeds from step 242 to step 244. In step 244 the first T/I threshold database retrieves the T/I threshold value (e.g., first T/I threshold value) corresponding to the determined frequency separation from the identified table (e.g., first T/I threshold table) corresponding to the pair of first transmitter device and first potential victim device (e.g., first victim receiver). Operation proceeds from step 244 to step 246. In step 246 the T/I threshold database is operated to send the retrieved T/I threshold value to the interference computational engine. Operation proceeds from step 246 to step 248. In step 248 the interference computational engine recovers the first T/I threshold value. Operation proceeds from step 236, via connecting node C 250 to step 252.

In step 252 the interference computational engine determines a first interference margin by subtracting, from the first T/I threshold value, a threshold level (Tc) of the first victim receiver divided by an expected interference level (Ic) at the first potential victim device. Step 252 includes step 254 in which the interference computational engine determines the first interference margin, where first interference margin=T/I−Tc/Ic.

Operation proceeds from step 252 to step 256. In step 256 the interference computational engine determines if the first potential victim device will be subject to unacceptable interference based on a first interference margin determined based on transmit or EIRP of first transmitter and path loss between the first transmitter and the first potential victim device. In various embodiments, said step of determining (256) if the first potential victim device will be subject to unacceptable interference is further based on a first threshold level (Tc) of the first potential victim device (first victim receiver).

Step 256 includes steps 258, 260 and 262. In step 258 the interference computational engine compares the determined first interference margin to 0) and determines if the first interference margin is greater than 0. If the determination is that the first interference margin is greater than 0, then operation proceeds from step 258 to step 260 in which the interference computational engine determines that the first potential victim (e.g., potential victim receiver device 136) will be subjected to unacceptable interference. However, if the determination is that the first interference margin is not greater than 0, then operation proceeds from step 258 to step 262 in which the interference computational engine determines that the first potential victim (e.g., potential victim receiver device 136) will not be subjected to unacceptable interference. Operation proceeds from step 256 to step 264.

In step 264 the interference computational engine sends an interference determination result to the frequency coordination system indicating whether or not the first potential victim will be subjected to unacceptable interference from the first transmitter. Operation proceeds from step 264 to step 266. In step 266 the frequency coordination system receives the interference determination result. Operation proceeds from step 266 to step 268.

In step 268 the frequency coordination system makes a decision to: i) authorize use of the first frequency by the first transmitter based on the expected transmit power or effective EIRP of the first transmitter and the first threshold value or ii) deny the used of the first frequency by the first transmitter based on the expected transmit power or effective EIRP of the first transmitter and the first threshold value. Step 268 includes steps 270 and 270, one of which is implemented for an iteration of step 268. In step 270 the frequency coordination system authorizes the use of the first frequency by the first transmitter device when the first potential victim device will not be subjected to unacceptable interference. In step 272 the frequency coordination system denies the use of the first frequency by the first transmitter device when the first potential victim device will be subjected to unacceptable interference. Operation proceeds from step 268 to step 274.

In step 274 the frequency coordination system communicates the decision to a device from which the frequency use request was received, e.g., first base station 132, including the first transmitter device 134.

Figure 3:
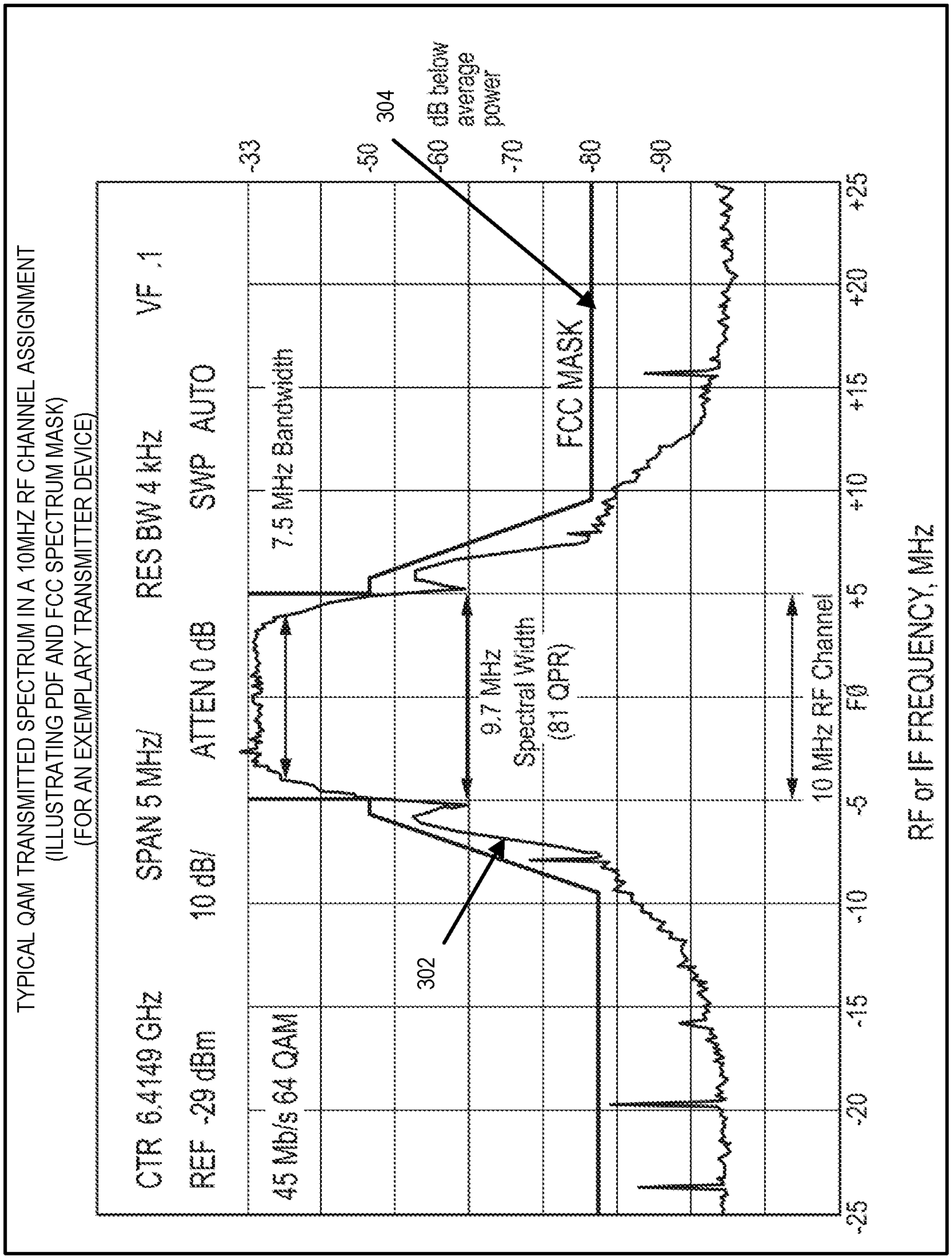
FIG. 3 is a drawing illustrating a typical QAM transmitted spectrum in a 10 MHz RF channel assignment, which illustrates a Power Density Function (PDF) and an FCC spectrum mask for an exemplary transmitter device.

FIG. 3 is a drawing 300 illustrating a typical QAM transmitted spectrum in a 10 MHz RF channel assignment, which illustrates an actual Power Density Function (PDF) 302 and an FCC spectrum mask 304 for an exemplary transmitter device.

Figure 4:
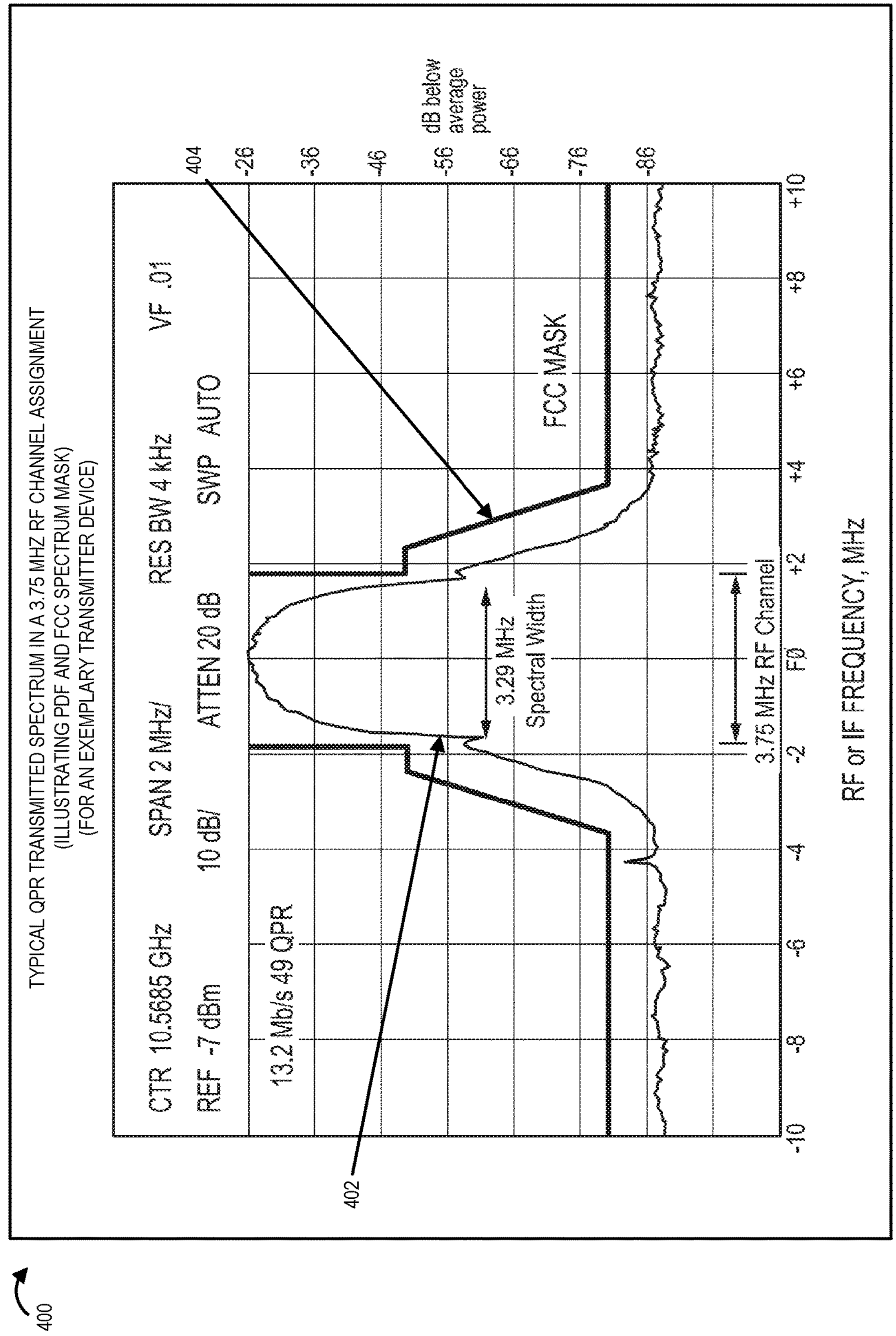
FIG. 4 is a drawing illustrating typical QPR transmitted spectrum in a 3.75 MHz RF channel assignment, which illustrates a Power Density Function (PDF) and an FCC spectrum mask for another exemplary transmitter device.

FIG. 4 is a drawing 400 illustrating typical QPR transmitted spectrum in a 3.75 MHz RF channel assignment, which illustrates an actual Power Density Function (PDF) 402 and an FCC spectrum mask 404 for another exemplary transmitter device.

FIG. 5 is an exemplary T/I table 500 for an exemplary transmitter device and receiver device pair. First column 502 identifies Δf and second column T/I value in (dB). First row 506 indicates that a Δf=0 maps to a T/I threshold value of 35 dB. Second row 508 indicates that a Δf=0 maps to a T/I threshold value of 35 dB. Third row 510 indicates that a Δf=4 maps to a T/I threshold value of 34 dB. Fourth row 512 indicates that a Δf=5 maps to a T/I threshold value of 34 dB. Fifth row 514 indicates that a Δf=6 maps to a T/I threshold value of 26 dB. Sixth row 516 indicates that a Δf=8 maps to a T/I threshold value of 12 dB. Seventh row 518 indicates that a Δf=10 maps to a T/I threshold value of 35 dB. Eighth row 520 indicates that a Δf=12 maps to a T/I threshold value of −12 dB. Ninth row 522 indicates that a Δf=14 maps to a T/I threshold value of −26 dB. Tenth row 524 indicates that a Δf=16 maps to a T/I threshold value of −36 dB. Eleventh row 526 indicates that a Δf=18 maps to a T/I threshold value of −46 dB. Twelfth row 528 indicates that a Δf=20 maps to a T/I threshold value of −53 dB.

Figure 6:
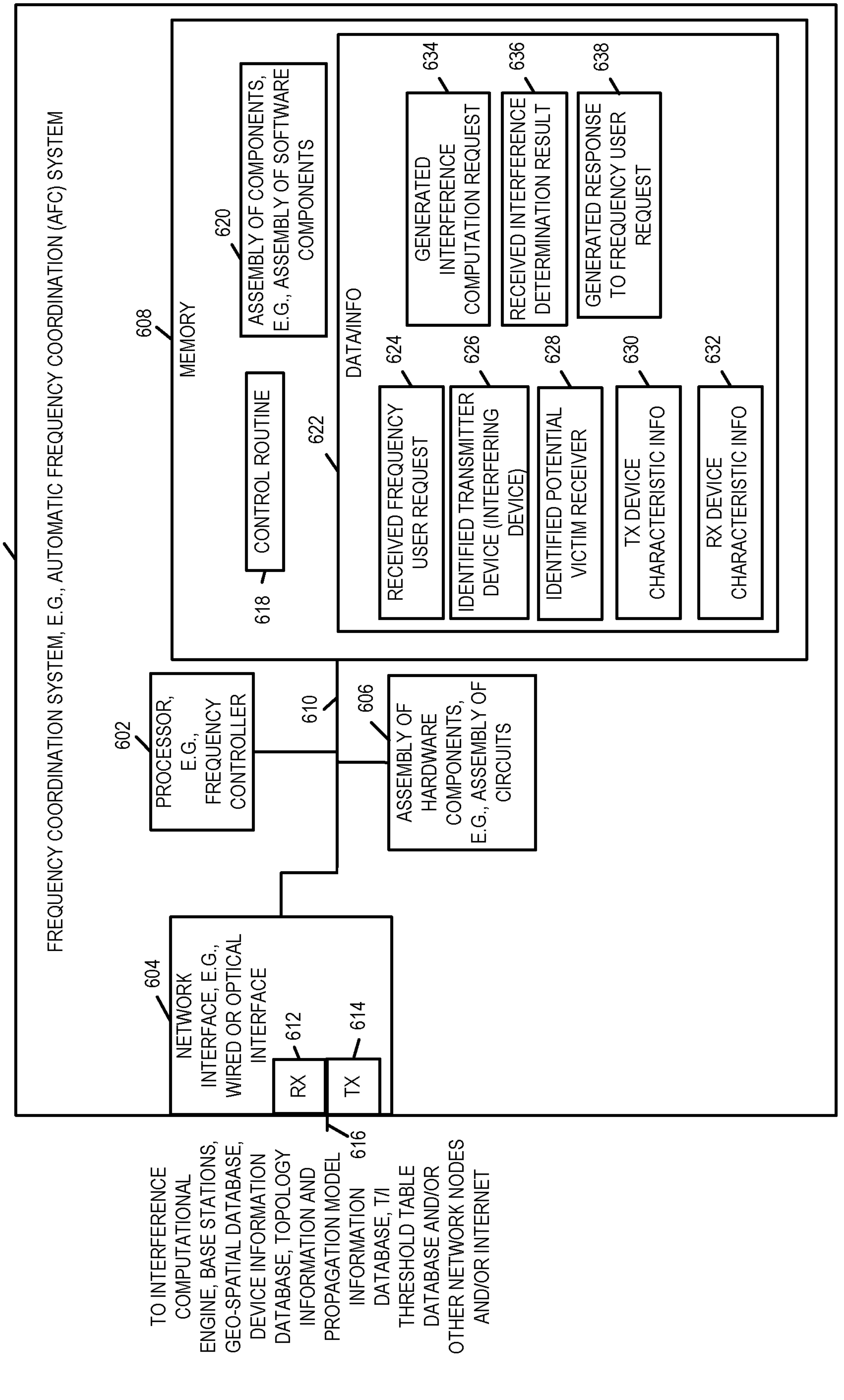
FIG. 6 is a drawing of an exemplary frequency coordination system, e.g., an automatic frequency coordination (AFC) system, in accordance with an exemplary embodiment.

FIG. 6 is a drawing of an exemplary frequency coordination system 600, e.g., an automatic frequency coordination (AFC) system, in accordance with an exemplary embodiment. Exemplary frequency coordination system 600 is, e.g., AFC system 102 of system 100 of FIG. 1 and/or a frequency coordination system implementing steps of the exemplary method of flowchart 200 of FIG. 2. Exemplary frequency coordination system 600 includes a processor 602, a network interface 604, e.g., a wired or optical interface, an assembly of hardware components 606, e.g., an assembly of circuits, and memory 608 coupled together via a bus 610 over which the various elements may interchange data and information.

Network interface 604 includes a receiver 612 and a transmitter 614 coupled to connector 616, which couples the frequency coordination system 600 to: an interference computational engine, base stations, a database of T/I threshold tables, a geo-spatial database, a device information database, a topology information and propagation model information database, and/or other network nodes and/or the Internet.

Memory 608 includes a control routine 618, an assembly of components 620 and data/information 622. Control routine 618 includes instructions which when executed by processor 602 control the frequency coordination system 600 to implement basic operational functions, e.g., read memory, write to memory, control an interface, load a program, subroutine, or app, etc. Assembly of components 620, e.g., an assembly of software components, e.g., routines, subroutines, applications, etc., includes, e.g., code which when executed by processor 602, controls the frequency coordination system 600 to implement steps of a method, e.g., steps of the method of flowchart 200 of FIG. 2 which are performed by a frequency coordination system.

Data/information 622 includes a received frequency user request 624 (e.g., a request to be allowed to use a band of spectrum with a carrier frequency) e.g., from a base station including a transmitter (which is potential interferer to a potential victim receiver, which is to be protected), an identified transmitter device 626 (interfering device), an identified potential victim receiver device 628 (e.g., in the proximity of the transmitter device such that there may be an interference issue), transmitter device characteristic information 630, e.g., a carrier frequency, a transmit power level or a EIRP, and receiver device characteristic information 632, e.g., a digital filter center frequency of the receiver device. Data/information 622 further includes a generated interference computation request 634 to be sent to a interference computational engine, a received interference determination result 636 (e.g., communicating an indication that the expected level of interference is unacceptable or is acceptable), and a generated response 638 to the frequency user request to be sent to the base station including the potential interfering transmitter (e.g., a grant allowing the requesting device to use the spectrum with or a denial to use the requested spectrum).

Figure 7:
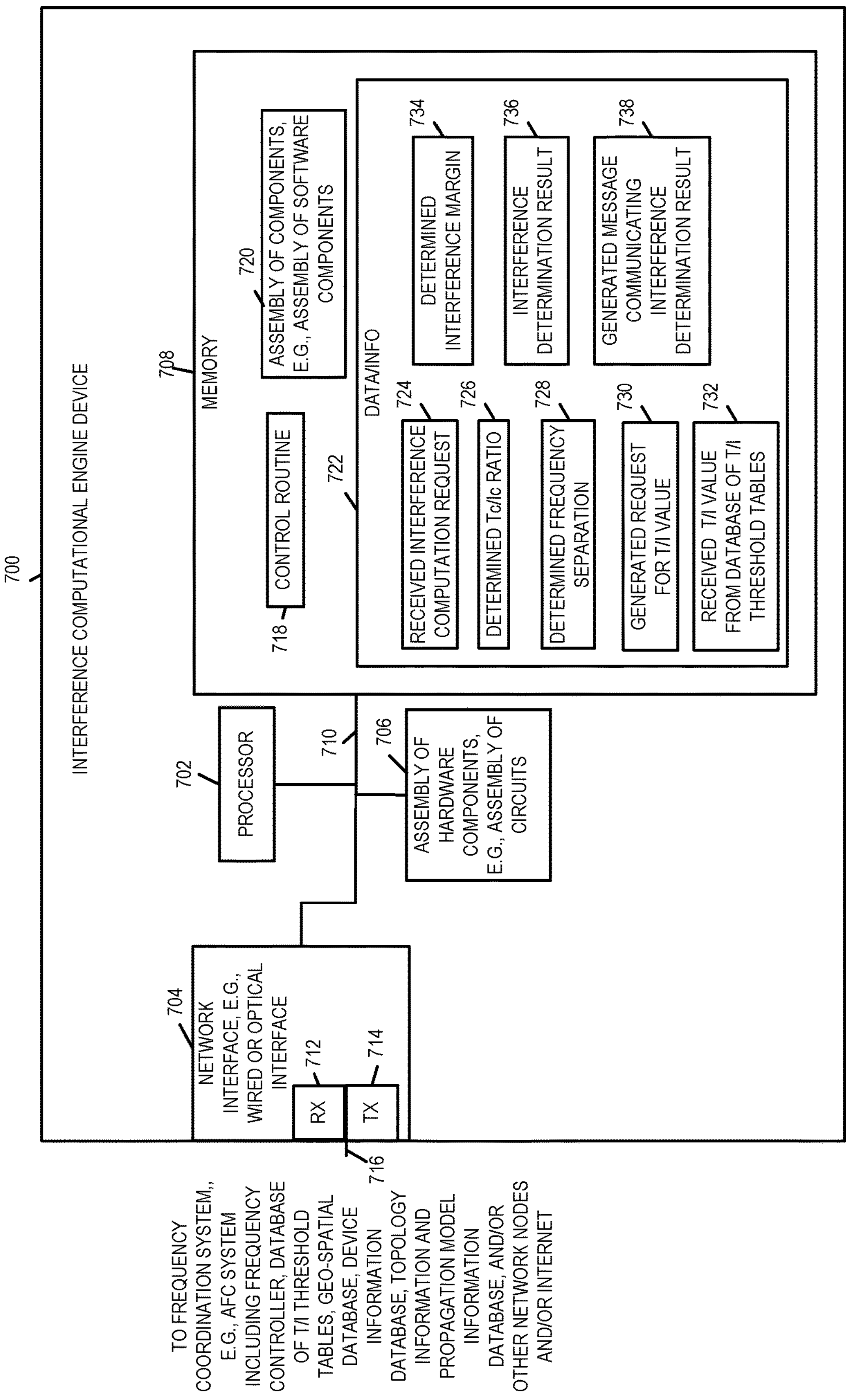
FIG. 7 is a drawing of an exemplary interference computational engine device in accordance with an exemplary embodiment.

FIG. 7 is a drawing of an exemplary interference computational engine device 700 in accordance with an exemplary embodiment. Exemplary interference computational engine device 700 is, e.g., interference computational engine 104 of system 100 of FIG. 1 and/or an interference computational engine implementing steps of the exemplary method of flowchart 200 of FIG. 2. Exemplary interference computational engine device 700 includes a processor 702, a network interface 704, e.g., a wired or optical interface, an assembly of hardware components 706, e.g., an assembly of circuits, and memory 708 coupled together via a bus 710 over which the various elements may interchange data and information.

Network interface 704 includes a receiver 712 and a transmitter 714 coupled to connector 716, which couples the interference computational engine 700 to: a frequency coordination system, e.g., an AFC system including a controller, a database of T/I threshold tables, a geo-spatial database, a device information database, a topology information and propagation model information database, and/or other network nodes and/or the Internet.

Memory 708 includes a control routine 718, an assembly of components 720 and data/information 722. Control routine 718 includes instructions which when executed by processor 702 control the interference computational engine device 700 to implement basic operational functions, e.g., read memory, write to memory, control an interface, load a program, subroutine, or app, etc. Assembly of components 720, e.g., an assembly of software components, e.g., routines, subroutines, applications, etc., includes, e.g., code which when executed by processor 702, controls the interference computational engine device 700 to implement steps of a method, e.g., steps of the method of flowchart 200 of FIG. 2 which are performed by an interference computational engine.

Data/information 722 includes a received interference computational request 724, a determined Tc/Ic ratio 726 (for an interfering transmitter device and potential victim receiver device), a determined frequency separation 728 (between the carrier frequency of the interfering signal and the center frequency of the digital receiver), a generated request 732 for a T/I threshold value (corresponding to TX/RX pair and the determined frequency separation), a received T/I threshold value 732 from a database of T/I threshold values which includes pre-configured T/I threshold values (for different frequency separation values) for combinations of possible TX/RX pairs, a determined interference margin 734 (based on the computed Tc/Ic ratio and the received T/I threshold value from the table. Data/information 736 further includes an interference determination result, e.g., a determination that the transmitter produces an unacceptable level of interference to the victim receiver device or a determination that the transmitter does not produce an unacceptable level to interference to the victim receiver device, and a generated message 738 communicating the interference determination result to the AFC system.

Figure 8:
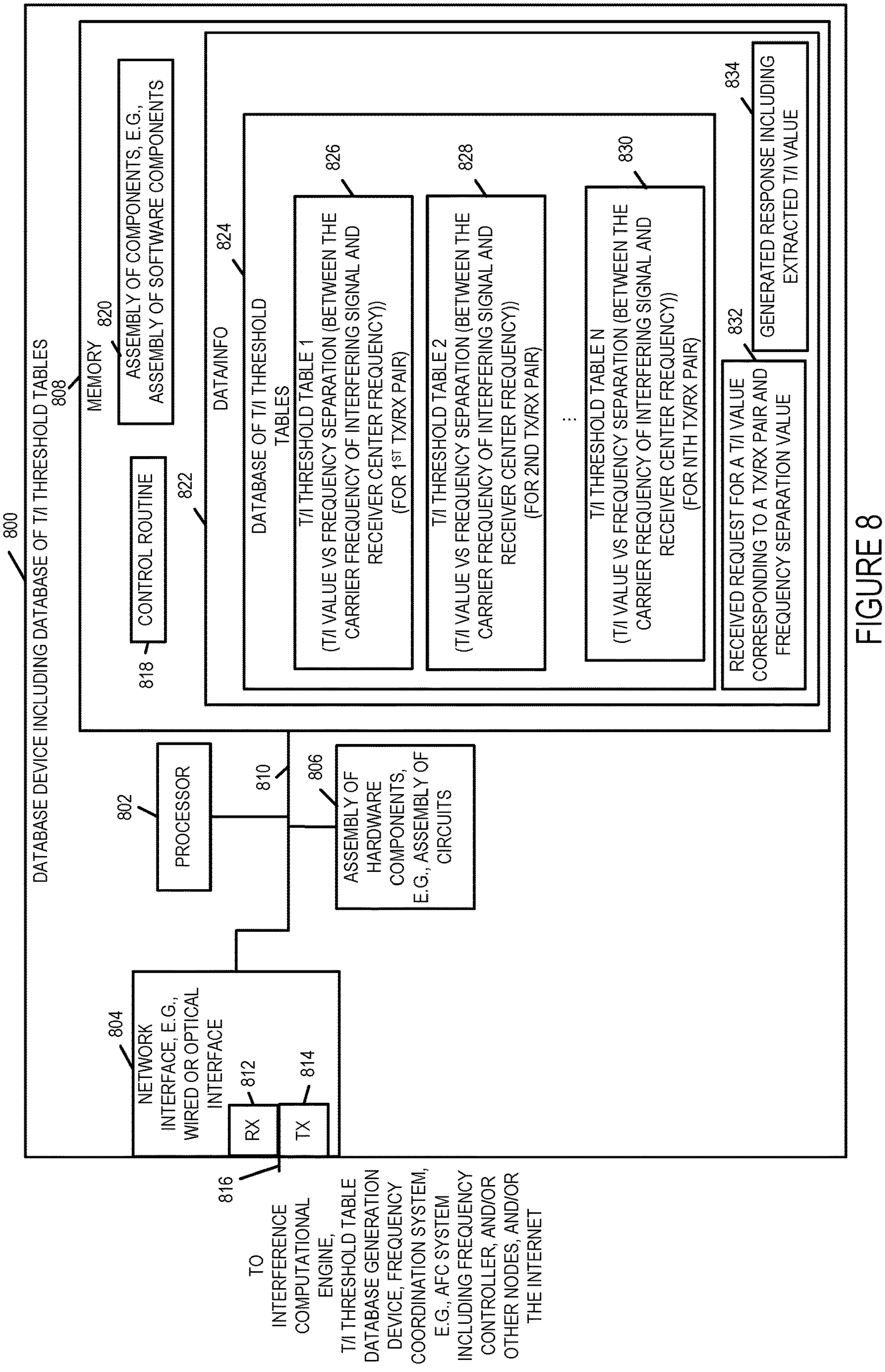
FIG. 8 is a drawing of an exemplary database device including a database of T/I threshold tables in accordance with an exemplary embodiment.

FIG. 8 is a drawing of an exemplary database device 800 including a database of T/I threshold tables in accordance with an exemplary embodiment. Exemplary database device 800 is, e.g., database of T/I threshold tables 106 of system 100 of FIG. 1 and/or a database device including a database of T/I threshold value implementing steps of the exemplary method of flowchart 200 of FIG. 2. Exemplary database device 800 includes a processor 802, a network interface 804, e.g., a wired or optical interface, an assembly of hardware components 806, e.g., an assembly of circuits, and memory 808 coupled together via a bus 810 over which the various elements may interchange data and information.

Network interface 804 includes a receiver 812 and a transmitter 814 coupled to connector 816, which couples the database device 800 to: an interference computational engine, a T/I threshold table database generation device, a frequency coordination system, e.g., an AFC system including a frequency controller, and/or other network nodes and/or the Internet.

Memory 808 includes a control routine 818, an assembly of components 820 and data/information 822. Control routine 818 includes instructions which when executed by processor 802 control the database device 800 to implement basic operational functions, e.g., read memory, write to memory, control an interface, load a program, subroutine, or app, etc. Assembly of components 820, e.g., an assembly of software components, e.g., routines, subroutines, applications, etc., includes, e.g., code which when executed by processor 802, controls the database device 800 to implement steps of a method, e.g., steps of the method of flowchart 200 of FIG. 2 which are performed by a database device including a database of T/I threshold values.

Data/information 822 includes database 824 of T/I threshold tables (T/I threshold table 1 826 (e.g., a T/I value vs frequency separation (between the carrier frequency on interfering signal and the receiver filter center frequency) table) for a 1st TX device/RX device pair, T/I threshold table 2 828 (e.g., a T/I value vs frequency separation (between the carrier frequency on interfering signal and the receiver filter center frequency) table) for a 2nd TX device/RX device pair, . . . , T/I threshold table N 830 (e.g., a T/I value vs frequency separation (between the carrier frequency on interfering signal and the receiver filter center frequency) table) for a Nth TX device/RX device pair), a received request 832 (from an interference computation engine) for a T/I value corresponding to a TX/RX pair (being evaluated) and a particular determined frequency separation value, and a generated response 834 includes an extracted T/I value, said generated response to be sent to the interference computational engine.

Figure 9:
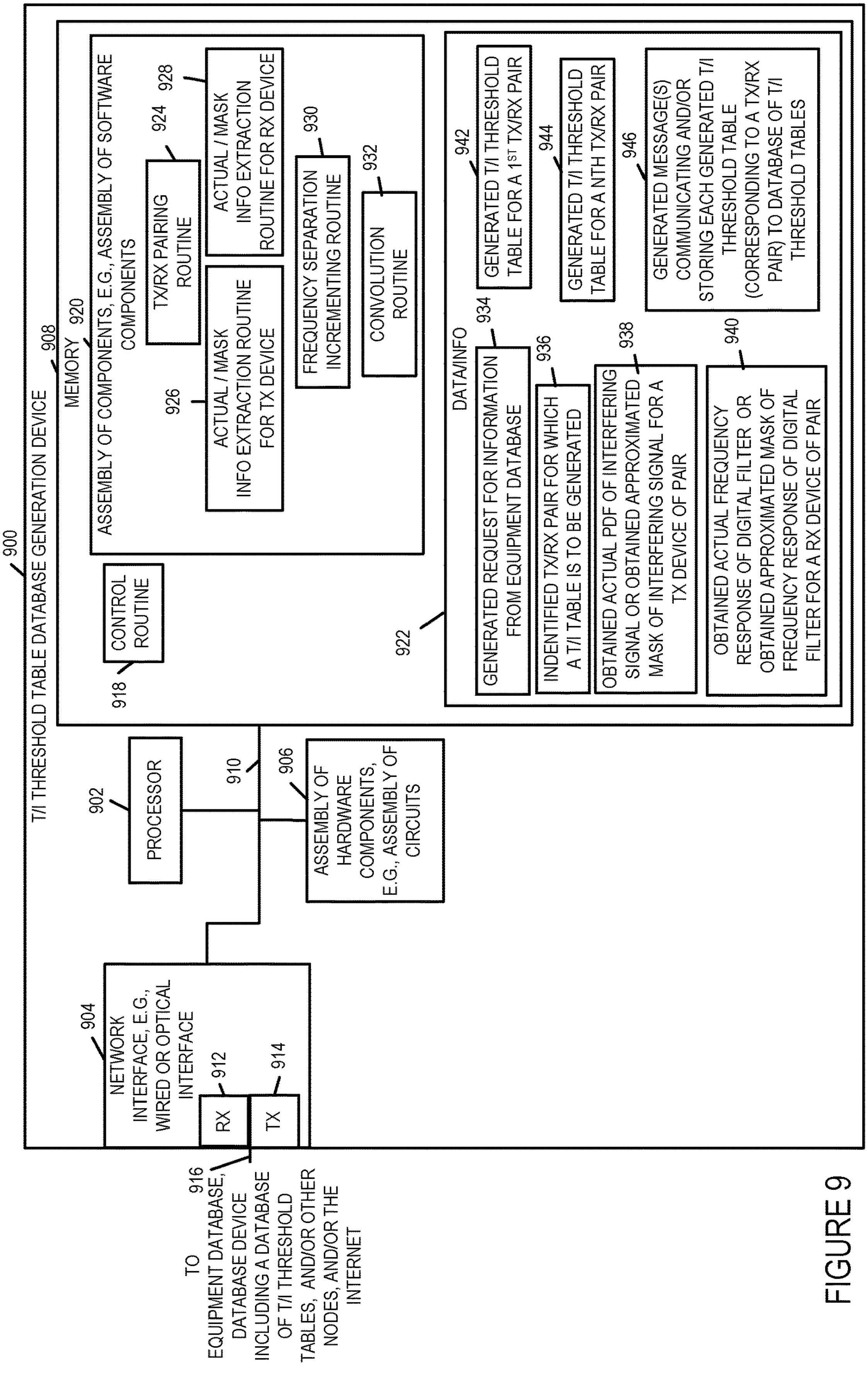
FIG. 9 is drawing of an exemplary T/I threshold table database generation device in accordance with an exemplary embodiment.

FIG. 9 is a drawing of an exemplary T/I threshold table database generation device 900 in accordance with an exemplary embodiment. T/I threshold table database generation device 900 is, e.g., T/I threshold table database generation device 112 of system 100 of FIG. 1 and/or a T/I threshold table database generation device implementing steps of flowchart 200 of FIG. 2. Exemplary T/I threshold table generation device 900 includes a processor 902, a network interface 904, e.g., a wired or optical interface, an assembly of hardware components 906, e.g., an assembly of circuits, and memory 908 coupled together via a bus 910 over which the various elements may interchange data and information.

Network interface 904 includes a receiver 912 and a transmitter 914 coupled to connector 916, which couples the generation device 900 to: an equipment database, a database device including a database of T/I threshold values, and/or other network nodes and/or the Internet.

Memory 908 includes a control routine 918, an assembly of components 920 and data/information 922. Control routine 918 includes instructions which when executed by processor 902 control the generation device 900 to implement basic operational functions, e.g., read memory, write to memory, control an interface, load a program, subroutine, or app, etc. Assembly of components 920, e.g., an assembly of software components, e.g., routines, subroutines, applications, etc., includes, e.g., code which when executed by processor 902, controls the generation device 900 to implement steps of a method, e.g., steps of the method of flowchart 200 of FIG. 2 which are performed by a T/I threshold table database generation device. Assembly of components 920 includes a TX/RX pairing routine 924, which identified combinations of pairs of a TX device and a TX device, an actual/mask information extraction routine 926 which extracts an actual PDF of an interfering signal or an approximated mask of an interfering signal for a particular TX device (device type) from the equipment database, and an actual/mask information extraction routine 928 which extracts an actual frequency response of a digital filter or an approximated mask of an frequency response of a digital filter for a particular RX device (device type) from the equipment database. Assembly of components 920 further includes a frequency separation incrementing routine 930 which increments the frequency separation value in steps (e.g., a set of predefined steps) so that a T/I threshold value can be calculated (via convolution) for each frequency separation value, to populate the table for a TX/RX pair. Assembly of components 920 further includes a convolution routine 932 for performing a convolution between: i) an obtained actual PDF of an interfering signal or an obtained approximated mask of an interfering signal for a TX device of a TX/RX pair, and ii) an obtained actual frequency response of a digital filter or an obtained approximated mask of a digital filter for a RX of a TX/RX pair.

Data/information 922 includes a generated request 934 for information from an equipment database, an identified TX/RX pair 936 for which a T/I table is to be generated, an obtained actual PDF of an interfering signal or an obtained approximated mask of an interfering signal for a TX device of a TX/RX device pair 938, and obtained actual frequency response of a digital filter or an obtained approximated mask of a frequency response of a digital filter of a TX device to a TX/RX device pair 940, a generated T/I threshold table 942 for a 1st Tx/RX pair, a generated T/I threshold table 944 for an Nth TX/RX pair, and generated messages 946 communicating and/or storing each generated T/I threshold table (corresponding to a TX/RX pair) to a database of T/I threshold tables.

Various aspects and/or features of some embodiments of the present invention are further discussed below.

Various exemplary embodiments are directed to methods and apparatus for the determination of the allowable interference into a digital system to be able to share the band among different users. An exemplary method, in some embodiments includes creating a Threshold to Interference (T/I) ratio table versus frequency separation between the carrier frequency of the interfering signal and the receiver center frequency based on the approach highlighted in TSB-10F bulletin (*TIA Telecommunication Systems Bulletin—Interference Criteria for Microwave Systems TSB-10F, June 1994).

In some embodiments, the T/I table is incorporated in a frequency controller, e.g., in a frequency coordination system (e.g., an AFC system), and is obtained by calculating its threshold values a priori based on the approach highlighted in the TIA-10F bulletin (*TIA Telecommunication Systems Bulletin—Interference Criteria for Microwave Systems TSB-10F, June 1994)

There are four cases that are considered to create the T/I table versus frequency separation between the carrier frequency of the interfering signal and the receiver center frequency. The T/I ratio table can be generated by using any one of the following quantities:

i) the actual Power Density Function (PDF) of the interfering signal and the actual frequency response of the digital receiver filter;

ii) the approximated mask of the PDF of the interfering signal and the actual frequency response mask of the digital receiver filter;

iii) the actual PDF of the interfering signal and the approximated frequency response mask of the digital receiver filter; or iv) the approximated mask of the PDF of the interfering signal and the approximated frequency response mask of the digital receiver filter.

Benefits of some embodiments of the present invention will now be described. A permanent database of the actual T/I threshold values based on the actual PDF of the interfering signals and of the actual frequency response of the digital receiver filters is obtained. Much more realistic T/I threshold values for a particular frequency separation between the carrier frequency of the interfering signal and the receiver center frequency are obtained using the current invention approach, than are typically obtained used current methods. Higher differences between the mask and the actual frequency response result in better sharing between the two systems.

By using the threshold T/I table, this approach, in accordance with the present invention, results in a faster computational time to find the T/I threshold value for a particular frequency separation between the carrier frequency of the interfering signal and the receiver center frequency. Thus, the interference calculation, performed in accordance with present invention, would be precise and time efficient.

In one embodiment of the present invention, the AFC system that holds the frequency controller (FC) requests to run an interference analysis between an interfering device and a victim receiver in proximity of each other. The frequency controller requests interference computation from the Interference Computational Engine as follows:

The frequency controller passes to the Interference Computational Engine, the equipment type/characteristics of the transmitter interferer and the equipment type/characteristics of the digital receiver.

The Interference Computational Engine reads the database table of T/I threshold values with knowledge of the equipment types of the interferer and the digital receiver, the difference in frequency between the interfering signal carrier frequency and the center frequency of the digital receiver filter; and obtains the T/I threshold value from the database tables.

Once the threshold T/I value is obtained, it is returned to the Interference Computational Engine to run the interference analysis based on the interfering signal transmit power or EIRP as well as other information, such as the transmission path losses, and inform the frequency controller if there is any interference. To find if there is or there is not interference the following steps are follow:

i) Compute the Threshold level of the victim receiver Tc;

ii) Compute the Interference level at the receiver victim from the interferer transmitter Ic;

iii) From the Table obtain the threshold T/I value and evaluate the margin $$\text{Margin} = T/I - Tc/Ic$$

iv) If the Margin is greater than zero then there is interference.

The Interference Computational Engine, in some embodiments, performs the following operations:

Runs Interference Analysis by computing Tc/Ic

Obtains T/I value from the database table

Computes the Margin

If Margin is positive then there is interference, and the computation engine informs to the Frequency Controller, e.g., included in the AFC system A Database Table of T/I values will now be described. A T/I table, in a database of T/I tables, includes T/I values (e.g., in dB) versus frequency, where the frequency separation is the separation between the carrier frequency of the interfering signal and the receiver (e.g., digital receiver filter) center frequency.

The creation of a T/I Table, in accordance with some embodiments, will now be described.

Actual Power Density Function (PDF) of the interfering signal or approximated mask of the PDF of the interfering signal is obtained, e.g., from an equipment database including specification sheets corresponding to a plurality of different vendors of transmitter devices (e.g., potential interfering transmitter devices).

Actual frequency response of the digital receiver filter or approximated frequency response mask of the digital receiver filter is obtained, e.g., from an equipment database including specification sheets corresponding to a plurality of different vendors of receiver devices (e.g., potential victim receiver devices).

Convolve the PDF of the interfering signal with the receiver filter response using as a reference TSB-10F bulletin (*TIA Telecommunication Systems Bulletin—Interference Criteria for Microwave Systems TSB-10F, June 1994)

In another embodiment of the invention, the creation of the T/I Table is done by convolving the PDF or approximated mask of the interfering signal with the actual or approximated frequency response mask of the digital receiver filter following the guideline of the TSB-10F bulletin (*TIA Telecommunication Systems Bulletin—Interference Criteria for Microwave Systems TSB-10F, June 1994). This is done by the frequency controller for every interferer transmitter equipment type and victim receiver equipment type. The approach is as follows:

Obtain from the Equipment Database the actual PDF of the interfering signal or the approximated PDF mask.

Obtain from the Equipment Database the approximated mask with the actual or approximated frequency response mask of the digital receiver filter.

Using a defined convolution as in TSB-10F bulletin (*TIA Telecommunication Systems Bulletin—Interference Criteria for Microwave Systems TSB-10F, June 1994), convolve the PDF of the interfering signal or approximated mask Pt with the actual or approximated frequency response mask of the digital receiver filter Hr $$10\log\left[\int H_r(f)P_t(f+\Delta f)df\right]$$

Repeat this process for every equipment in the Equipment Database, creating the threshold T/I Table For every new equipment repeat the process by following the steps above.

A Database Table of T/I values will now be described. A T/I table, in a database of T/I tables, includes T/I values (e.g., in dB) versus frequency, where the frequency separation is the separation between the carrier frequency of the interfering signal and the receiver (e.g., digital receiver filter) center frequency.

In some embodiments, the Creation of the T/I Table includes the following operations:

Obtain actual Power Density Function (PDF) of the interfering signal or approximated mask of the PDF of the interfering signal.

Obtain actual frequency response of the digital receiver filter or approximated frequency response mask of the digital receiver filter.

Convolve the PDF of the interfering signal with the receiver filter response using as a reference TSB-10F bulletin (see TIA Telecommunication Systems Bulletin—Interference Criteria for Microwave Systems TSB-10F, June 1994).

Find the T/I Table

The PDF and the Federal Communication Commission (FCC) spectrum mask for a couple of incumbent microwave systems* are shown in FIGS. 3 and 4.

The higher the difference between the two, the better the sharing between the two systems becomes.

The T/I Table (e.g., T/I Table 500 of FIG. 5) is obtained, in some embodiments, as follows:

Obtain the PDF of the interfering signal Pt as given in FIG. 3.

Obtain the approximated mask with the actual or approximated frequency response mask of the digital receiver filter Hr. If the frequency response mask of the digital receiver filter is not available, then it could be used the PDF of the desired transmitted signal. In the present example the PDF of the desired transmitted signal is the same as the PDF of the interferer transmitter as given in FIG. 3.

To obtain the T/I table—Convolve the PDF of the interfering signal or approximated mask with the actual or approximated frequency response mask of the digital receiver filter as give in TSB-10F bulletin (see TIA Telecommunication Systems Bulletin—Interference Criteria for Microwave Systems TSB-10F, June 1994)

$$10\log\left[\int H_r(f)P_t(f+\Delta f)df\right]$$

While various components are shown as separate elements in one or more examples, it should be appreciated that the elements can be combined, e.g., to reduce the number of separate devices or components and reducing signaling between the components. For example, one more of all of the interference computational engine 104, database of T/I threshold tables 106 and/or T/I threshold table database generation device 112 may and sometimes are combined or incorporated into the automatic frequency coordination (AFC) system 102.

NUMBERED LIST OF EXEMPLARY METHOD EMBODIMENTS

Method Embodiment 1. A Method of Controlling Frequency sharing, the method comprising: storing (204) in a T/I threshold table database a plurality of T/I threshold tables for different transmitter device and receiver device pairs, each T/I threshold table including a plurality of T/I threshold values for an individual transmitter and receiver device pair, each T/I threshold value in a T/I threshold table corresponding to a different amount of frequency separation; receiving (206), at a frequency coordination system (e.g., automatic frequency coordination (AFC)), a frequency use request seeking permission for a first transmitter device to use a first frequency; identifying (208), at the frequency coordination system, (e.g., based on location information and/or other stored or received information) a first potential victim device (e.g., a first receiver device) which may be subject to interference from the first transmitter device using the first frequency; retrieving (236) from a first T/I threshold table stored in said T/I threshold table database, a first T/I threshold value based on a frequency separation between the first frequency used by the first transmitter and a frequency used by the first potential victim device, said first T/I threshold table being a T/I threshold table corresponding to the first transmitter device and the first potential victim device (e.g., a first victim receiver); and making (268) a decision, at the frequency coordination system, to: i) authorize use of the first frequency by the first transmitter based on the expected transmit power or Effective Isotropic Radiated Power (EIRP) of the first transmitter and the first T/I threshold value or ii) deny use of the first frequency by the first transmitter based on the expected transmit power or Effective Isotropic Radiated Power (EIRP) of the first transmitter and the first T/I threshold value.

Method Embodiment 2. The method of Method Embodiment 1, further comprising: communicating (274) the decision to a device from which said frequency use request was received (e.g., a first base station including the first transmitter device).

Method Embodiment 3. The method of Method Embodiment 1, wherein the first frequency is a carrier frequency used by the first transmitter device and where the frequency separation between the first frequency and the frequency used by the first potential victim device (e.g., first receiver) is the frequency difference between first frequency and the center frequency of a digital receiver of the first potential victim device (e.g., first receiver device); and wherein the method further includes determining (232), by an interference computational engine, the frequency separation between the first frequency and the frequency used by the first potential victim device.

Method Embodiment 4. The method of Method Embodiment 3, further comprising: determining (256), at the interference computational engine, if the first potential victim device will be subject to unacceptable interference based on a first interference margin determined based on transmit or EIRP of the first transmitter device and path loss between the first transmitter device and first potential victim device.

Method Embodiment 5. The method of Method Embodiment 4, wherein determining (256) if the first potential victim device will be subject to unacceptable interference is further based on a first threshold level (Tc) of the first potential victim device (first victim receiver).

Method Embodiment 6. The method of Method Embodiment 5, further comprising: determining (252), by the interference computational engine, said first interference margin by subtracting, from the first T/I threshold value, a threshold level (Tc) of the first victim receiver divided by an expected interference level (Ic) (from the interfering transmitter which is the first transmitter) at the first potential victim device (where in some embodiments the first interference margin is determined (254) as T/I−Tc/Ic).

Method Embodiment 7. The method of Method Embodiment 4, wherein making (268) a decision includes i) authorizing (270) use of the first frequency by the first transmitter device when the first potential victim device will not be subjected to unacceptable interference and ii) denying (272) use of the first frequency by the first transmitter device when the first potential victim device will be subjected to unacceptable interference.

Method Embodiment 8. The method of Method Embodiment 7, further comprising: prior to receiving, the first frequency use request, computing (203) T/I threshold tables for multiple different possible transmitter device and receiver device pairs, each of the different possible transmitter device and receive device pairs corresponding to a different transmitter device and receiver device combination, said first T/I threshold table being one of computed T/I threshold tables (e.g., the first T/I threshold table is precomputed to be available to be used for requests).

Method Embodiment 8A. The method of Method Embodiment 8, wherein threshold values in said first T/I threshold table are computed (2034) based on a first actual Power Density Function (PDF) of an interfering signal generated by the first transmitter and an approximated frequency response mask of a digital receiver filter included in the first receiver.

Method Embodiment 8B. The method of Method Embodiment 8, wherein threshold values in said first T/I threshold table are computed based (2035) on an approximated mask of the Power Density Function (PDF) of an interfering signal which is generated by the first transmitter and an actual frequency response of a digital receiver filter included in the first receiver.

Method Embodiment 9. The method of Method Embodiment 8, wherein threshold values in said first T/I threshold table are computed (2032) based on actual known transmitter characteristics of the first transmitter and actual known characteristics of said first receiver prior to said first frequency request being received.

Method Embodiment 10. The method of Method Embodiment 9, wherein the actual known transmitter characteristics of the first transmitter include a first actual Power Density Function (PDF) of an interfering signal which is generated by the first transmitter; and wherein the actual known characteristics of said first receiver include a first actual frequency response of a digital receiver filter included in the first receiver.

Method Embodiment 11. The method of Method Embodiment 10, wherein computing (203) T/I threshold tables includes computing (2032) said first T/I table, and wherein computing (2032) the first T/I table includes convolving (2033) the first actual PDF of the interfering signal with the actual frequency response of the digital receiver filter included in the first receiver (e.g., as described in Telecommunications Industry Association (TIA) bulletin TSB-10F (Telecommunication Systems Bulletin—Interference Criteria for Microwave Systems TSB-10F, June 1994)).

NUMBERED LIST OF EXEMPLARY SYSTEM EMBODIMENTS

System Embodiment 1. A system (100) for controlling frequency sharing, the system (100) comprising: a T/I threshold table database (106 or 800 or 824) storing a plurality of T/I threshold tables for different transmitter device and receiver device pairs, each T/I threshold table including a plurality of T/I threshold values for an individual transmitter and receiver device pair, each T/I threshold value in a T/I threshold table corresponding to a different amount of frequency separation; a frequency coordination system (e.g., automatic frequency coordination (AFC) system) (102 or 600) including: an interface receiver (612); and a first processor (e.g., a frequency controller) (103 or 602), and wherein said first processor is configured to: operate the frequency coordination system to receive (206) (via interface receiver 612) a frequency use request seeking permission for a first transmitter device (134) to use a first frequency; identify (208), at the frequency coordination system, (e.g., based on location information and/or other stored or received information) a first potential victim device (e.g., a first receiver device) (136) which may be subject to interference from the first transmitter device (134) using the first frequency; operate the frequency coordination system to retrieve (236) from a first T/I threshold table (108 or 826) stored in said T/I threshold table database (106 or 800 or 824), a first T/I threshold value based on a frequency separation between the first frequency used by the first transmitter (134) and a frequency used by the first potential victim device (136), said first T/I threshold table being a T/I threshold table corresponding to the first transmitter device (134) and the first potential victim device (e.g., a first victim receiver) (136); and make (268) a decision, at the frequency coordination system, to: i) authorize use of the first frequency by the first transmitter (134) based on the expected transmit power or Effective Isotropic Radiated Power (EIRP) of the first transmitter (134) and the first T/I threshold value or ii) deny use of the first frequency by the first transmitter (134) based on the expected transmit power or Effective Isotropic Radiated Power (EIRP) of the first transmitter (134) and the first T/I threshold value.

System Embodiment 2. The system (100) of System Embodiment 1, wherein said frequency coordination system (102 or 600) further includes an interface transmitter (614); and wherein said first processor (103 or 602) is further configured to operate the frequency coordination system to: communicate (274) (via interface transmitter 614) the decision to a device (e.g., first base station 132) from which said frequency use request was received (e.g., a first base station (132) including the first transmitter device (134)).

System Embodiment 3. The system (100) of System Embodiment 1, further comprising: an interference computational engine (104 or 700) including a second processor (702); wherein the first frequency is a carrier frequency used by the first transmitter device (134) and where the frequency separation between the first frequency and the frequency used by the first potential victim device (e.g., first receiver) (136) is the frequency difference between first frequency and the center frequency of a digital receiver of the first potential victim device (e.g., first receiver device) (136); and wherein the second processor (702) is configured to determine (232) the frequency separation between the first frequency and the frequency used by the first potential victim device (136).

System Embodiment 4. The system (100) of System Embodiment 3, wherein said second processor (702) is configured to determine (256), at the interference computational engine, if the first potential victim device will be subject to unacceptable interference based on a first interference margin determined based on transmit or EIRP of the first transmitter device (134) and path loss between the first transmitter device (134) and first potential victim device (136).

System Embodiment 5. The system (100) of System Embodiment 4, wherein said determining (256) if the first potential victim device will be subject to unacceptable interference is further based on a first threshold level (Tc) of the first potential victim device (first victim receiver) (136).

System Embodiment 6. The system (100) of System Embodiment 5, wherein said second processor (702) is further configured to: determine (252), by the interference computational engine, said first interference margin by subtracting, from the first T/I threshold value, a threshold level (Tc) of the first victim receiver divided by an expected interference level (Ic) (from the interfering transmitter which is the first transmitter) at the first potential victim device (where in some embodiments the first interference margin is determined (254) as T/I−Tc/Ic).

System Embodiment 7. The system (100) of System Embodiment 4, wherein said making (268) a decision includes i) authorizing (270) use of the first frequency by the first transmitter device when the first potential victim device will not be subjected to unacceptable interference and ii) denying (272) use of the first frequency by the first transmitter device when the first potential victim device will be subjected to unacceptable interference.

System Embodiment 8. The system (100) of System Embodiment 7, further comprising: a T/I threshold table generation device (112 or 900) including a third processor (902) configured to: compute (203) T/I threshold tables for multiple different possible transmitter device and receiver device pairs, each of the different possible transmitter device and receive device pairs corresponding to a different transmitter device and receiver device combination, said first T/I threshold table being one of computed T/I threshold tables (e.g., the first T/I threshold table is precomputed to be available to be used for requests), said computing of T/I threshold tables being performed prior to said frequency coordination system receiving the first frequency use request.

System Embodiment 8A. The system (100) of System Embodiment 8, wherein threshold values in said first T/I threshold table are computed (2034) based on a first actual Power Density Function (PDF) of an interfering signal generated by the first transmitter and an approximated frequency response mask of a digital receiver filter included in the first receiver.

System Embodiment 8B. The system (100) of System Embodiment 8, wherein threshold values in said first T/I threshold table are computed based (2035) on an approximated mask of the Power Density Function (PDF) of an interfering signal which is generated by the first transmitter and an actual frequency response of a digital receiver filter included in the first receiver.

System Embodiment 9. The system (100) of System Embodiment 8, wherein threshold values in said first T/I threshold table are computed (2032) based on actual known transmitter characteristics of the first transmitter and actual known characteristics of said first receiver prior to said first frequency request being received.

System Embodiment 10. The system (100) of System Embodiment 9, wherein the actual known transmitter characteristics of the first transmitter (134) include a first actual Power Density Function (PDF) of an interfering signal which is generated by the first transmitter; and wherein the actual known characteristics of said first receiver (136) include a first actual frequency response of a digital receiver filter included in the first receiver.

System Embodiment 11. The system (100) of System Embodiment 10, wherein said third processor (902) is configured to: compute (2032) said first T/I table, as part of being configured to compute (203) T/I threshold tables, and wherein said third processor (902) is configured to: convolve (2033) the first actual PDF of the interfering signal with the actual frequency response of the digital receiver filter included in the first receiver (e.g., as described in Telecommunications Industry Association (TIA) bulletin TSB-10F (Telecommunication Systems Bulletin—Interference Criteria for Microwave Systems TSB-10F, June 1994)), as part of being configured to compute (2032) the first T/I table.

NUMBERED LIST OF EXEMPLARY NON-TRANSITORY COMPUTER READABLE MEDIUM EMBODIMENTS

Non-Transitory Computer Readable Medium Embodiment 1. A non-transitory computer readable medium (608) including machine readable instructions, which when executed by a processor (103 or 602) of a frequency coordination system (102 or 600) (e.g., an AFC system) control the frequency coordination system (102 or 600) to perform the steps of: receiving (206), at a frequency coordination system (e.g., automatic frequency coordination (AFC)), a frequency use request seeking permission for a first transmitter device to use a first frequency; identifying (208), at the frequency coordination system, (e.g., based on location information and/or other stored or received information) a first potential victim device (e.g., a first receiver device) which may be subject to interference from the first transmitter device using the first frequency; retrieving (236) from a first T/I threshold table stored in a T/I threshold table database, a first T/I threshold value based on a frequency separation between the first frequency used by the first transmitter and a frequency used by the first potential victim device, said first T/I threshold table being a T/I threshold table corresponding to the first transmitter device and the first potential victim device (e.g., a first victim receiver); and making (268) a decision, at the frequency coordination system, to: i) authorize use of the first frequency by the first transmitter based on the expected transmit power or Effective Isotropic Radiated Power (EIRP) of the first transmitter and the first T/I threshold value or ii) deny use of the first frequency by the first transmitter based on the expected transmit power or Effective Isotropic Radiated Power (EIRP) of the first transmitter and the first T/I threshold value.

Non-Transitory Computer Readable Medium Embodiment 2. A non-transitory computer readable medium (908) including machine readable instructions, which when executed by a processor (902) of a T/I threshold table generation device (112 or 900) (e.g., control the T/I threshold table generation device (112 or 900) to perform the step of: storing (204) in a T/I threshold table database (106 or 800 or 824) a plurality of T/I threshold tables for different transmitter device and receiver device pairs, each T/I threshold table including a plurality of T/I threshold values for an individual transmitter and receiver device pair, each T/I threshold value in a T/I threshold table corresponding to a different amount of frequency separation.

Non-Transitory Computer Readable Medium Embodiment 3. The non-transitory computer readable medium (908) of non-transitory computer readable medium embodiment 2, further comprising: machine readable instructions, which when executed by a processor (902) of the T/I threshold table generation device (112 or 900) (e.g., control the T/I threshold table generation device (112 or 900) to perform the additional step of: computing (203) T/I threshold tables for multiple different possible transmitter device and receiver device pairs, each of the different possible transmitter device and receive device pairs corresponding to a different transmitter device and receiver device combination, said first T/I threshold table being one of computed T/I threshold tables (e.g., the first T/I threshold table is precomputed to be available to be used for requests) (said computing of T/I threshold tables being performed prior to a frequency coordination system receiving the a first frequency use request).

Non-Transitory Computer Readable Medium Embodiment 4. A non-transitory computer readable medium (808) including machine readable instructions, which when executed by a processor (802) of a T/I threshold tables database device (106 or 800) control the T/I threshold tables database device (106 or 800) to perform the step of: storing (204) in a T/I threshold table database (824) a plurality of T/I threshold tables for different transmitter device and receiver device pairs, each T/I threshold table including a plurality of T/I threshold values for an individual transmitter and receiver device pair, each T/I threshold value in a T/I threshold table corresponding to a different amount of frequency separation.

The techniques of various embodiments may be implemented using software, hardware and/or a combination of software and hardware. Various embodiments are directed to apparatus, e.g., an AFC system or components of an AFC system, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, are configured to perform the steps of the methods described as being performed by the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a user equipment device, wireless device, mobile device, smartphone, subscriber device, desktop computer, printer, IPTV, laptop, tablets, network edge device, Access Point, wireless router, switch, WLAN controller, orchestration server, orchestrator, Gateway, AAA server, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of controlling frequency sharing, the method comprising:

storing in a Threshold to Interference (T/I) threshold table database a plurality of T/I threshold tables for different transmitter device and receiver device pairs, each T/I threshold table including a plurality of T/I threshold values for an individual transmitter and receiver device pair, each T/I threshold value in a T/I threshold table corresponding to a different amount of frequency separation;

receiving, at a frequency coordination system, a frequency use request seeking permission for a first transmitter device to use a first frequency;

identifying, at the frequency coordination system, a first potential victim device which may be subject to interference from the first transmitter device using the first frequency;

retrieving from a first T/I threshold table stored in said T/I threshold table database, a first T/I threshold value based on a frequency separation between the first frequency used by the first transmitter device and a frequency used by the first potential victim device, said first T/I threshold table being a T/I threshold table corresponding to the first transmitter device and the first potential victim device; and making a decision, at the frequency coordination system, to: i) authorize use of the first frequency by the first transmitter device based on the expected transmit power or Effective Isotropic Radiated Power (EIRP) of the first transmitter device and the first T/I threshold value or ii) deny use of the first frequency by the first transmitter device based on an expected transmit power or Effective Isotropic Radiated Power (EIRP) of the first transmitter device and the first T/I threshold value.

2. The method of claim 1, further comprising:

communicating the decision to a device from which said frequency use request was received.

3. The method of claim 1, wherein the first frequency is a carrier frequency used by the first transmitter device and wherein the frequency separation between the first frequency and the frequency used by the first potential victim device is a frequency difference between first frequency and the center frequency of a digital receiver of the first potential victim device; and wherein the method further includes determining, by an interference computational engine, the frequency separation between the first frequency and the frequency used by the first potential victim device.

4. The method of claim 3, further comprising:

determining, at the interference computational engine, if the first potential victim device will be subject to unacceptable interference based on a first interference margin determined based on transmit power or EIRP of the first transmitter device and path loss between the first transmitter device and first potential victim device.

5. The method of claim 4, wherein determining if the first potential victim device will be subject to unacceptable interference is further based on a first threshold level (Tc) of the first potential victim device.

6. The method of claim 5, further comprising:

determining, by the interference computational engine, said first interference margin by subtracting, from the first T/I threshold value, the first threshold level (Tc) of the first potential victim device divided by an expected interference level (Ic) at the first potential victim device.

7. The method of claim 4, wherein making a decision includes i) authorizing use of the first frequency by the first transmitter device when the first potential victim device will not be subjected to unacceptable interference and ii) denying use of the first frequency by the first transmitter device when the first potential victim device will be subjected to unacceptable interference.

8. The method of claim 7, further comprising:

prior to receiving, the frequency use request, computing T/I threshold tables for multiple different possible transmitter device and receiver device pairs, each of the different possible transmitter device and receive device pairs corresponding to a different transmitter device and receiver device combination, said first T/I threshold table being one of computed T/I threshold tables.

9. The method of claim 8, wherein threshold values in said first T/I threshold table are computed based on a first actual Power Density Function (PDF) of an interfering signal generated by the first transmitter device and an approximated frequency response mask of a digital receiver filter included in a first receiver device.

10. The method of claim 8, wherein threshold values in said first T/I threshold table are computed based on an approximated mask of the Power Density Function (PDF) of an interfering signal which is generated by the first transmitter device and an actual frequency response of a digital receiver filter included in a first receiver device.

11. The method of claim 8, wherein threshold values in said first T/I threshold table are computed based on actual known transmitter characteristics of the first transmitter device and actual known characteristics of a first receiver device prior to said frequency use request being received.

12. The method of claim 11, wherein the actual known transmitter characteristics of the first transmitter device include a first actual Power Density Function (PDF) of an interfering signal which is generated by the first transmitter device; and wherein the actual known characteristics of said first receiver device include a first actual frequency response of a digital receiver filter included in the first receiver device.

13. The method of claim 12, wherein computing T/I threshold tables includes computing said first T/I threshold table, and wherein computing the first T/I threshold table includes convolving the first actual PDF of the interfering signal with the actual frequency response of the digital receiver filter included in the first receiver device.

14. A system for controlling frequency sharing, the system comprising:

a Threshold to Interference (T/I) threshold table database storing a plurality of T/I threshold tables for different transmitter device and receiver device pairs, each T/I threshold table including a plurality of T/I threshold values for an individual transmitter and receiver device pair, each T/I threshold value in a T/I threshold table corresponding to a different amount of frequency separation;

a frequency coordination system including:

an interface receiver; and a first processor, and wherein said first processor is configured to:

operate the frequency coordination system to receive a frequency use request seeking permission for a first transmitter device to use a first frequency;

identify, at the frequency coordination system, a first potential victim device which may be subject to interference from the first transmitter device using the first frequency;

operate the frequency coordination system to retrieve from a first T/I threshold table stored in said T/I threshold table database, a first T/I threshold value based on a frequency separation between the first frequency used by the first transmitter device and a frequency used by the first potential victim device, said first T/I threshold table being a T/I threshold table corresponding to the first transmitter device and the first potential victim device; and make a decision, at the frequency coordination system, to: i) authorize use of the first frequency by the first transmitter device based on the expected transmit power or Effective Isotropic Radiated Power (EIRP) of the first transmitter device and the first T/I threshold value or ii) deny use of the first frequency by the first transmitter device based on an expected transmit power or Effective Isotropic Radiated Power (EIRP) of the first transmitter device and the first T/I threshold value.

15. The system of claim 14, wherein said frequency coordination system further includes an interface transmitter; and wherein said first processor is further configured to operate the frequency coordination system to:

communicate the decision to a device from which said frequency use request was received.

16. The system of claim 14, further comprising:

an interference computational engine including a second processor;

wherein the first frequency is a carrier frequency used by the first transmitter device and wherein the frequency separation between the first frequency and the frequency used by the first potential victim device is a frequency difference between first frequency and the center frequency of a digital receiver of the first potential victim device; and wherein the second processor is configured to determine the frequency separation between the first frequency and the frequency used by the first potential victim device.

17. The system of claim 16, wherein said second processor is configured to determine, at the interference computational engine, if the first potential victim device will be subject to unacceptable interference based on a first interference margin determined based on transmit power or EIRP of the first transmitter device and path loss between the first transmitter device and first potential victim device.

18. The system of claim 17, wherein said determining if the first potential victim device will be subject to unacceptable interference is further based on a first threshold level (Tc) of the first potential victim device.

19. The system of claim 18, wherein said second processor is further configured to:

determine, by the interference computational engine, said first interference margin by subtracting, from the first T/I threshold value, the first threshold level (Tc) of the first potential victim device divided by an expected interference level (Ic) at the first potential victim device; and wherein said making a decision includes i) authorizing use of the first frequency by the first transmitter device when the first potential victim device will not be subjected to unacceptable interference and ii) denying use of the first frequency by the first transmitter device when the first potential victim device will be subjected to unacceptable interference.

20. A non-transitory computer readable medium including machine readable instructions, which when executed by a processor of a frequency coordination system, controls the frequency coordination system to perform the steps of:

receiving a frequency use request seeking permission for a first transmitter device to use a first frequency;

identifying, at the frequency coordination system, a first potential victim device which may be subject to interference from the first transmitter device using the first frequency;

retrieving from a first Threshold to Interference (T/I) threshold table stored in a T/I threshold table database, a first T/I threshold value based on a frequency separation between the first frequency used by the first transmitter device and a frequency used by the first potential victim device, said first T/I threshold table being a T/I threshold table corresponding to the first transmitter device and the first potential victim device; and making a decision, at the frequency coordination system, to: i) authorize use of the first frequency by the first transmitter device based on the expected transmit power or Effective Isotropic Radiated Power (EIRP) of the first transmitter device and the first T/I threshold value or ii) deny use of the first frequency by the first transmitter device based on an expected transmit power or Effective Isotropic Radiated Power (EIRP) of the first transmitter device and the first T/I threshold value.

* * * * *